United States Patent
Ito et al.

[11] Patent Number: 5,961,910
[45] Date of Patent: Oct. 5, 1999

[54] MANUFACTURING METHOD OF RESIN MOLDED ASSEMBLY

[75] Inventors: Hikaru Ito; Shinsuke Tsutsui; Yasunori Wada; Osamu Taniuchi; Seiichi Kurosawa, all of Yokkaichi, Japan

[73] Assignee: Sumitomo Wiring Systems, Ltd., Mie, Japan

[21] Appl. No.: 09/052,941

[22] Filed: Apr. 1, 1998

Related U.S. Application Data

[62] Division of application No. 08/613,391, Mar. 7, 1996, Pat. No. 5,814,356.

[30] Foreign Application Priority Data

| Mar. 10, 1995 | [JP] | Japan | 7-79618 |
| Mar. 10, 1995 | [JP] | Japan | 7-79619 |
| Mar. 13, 1995 | [JP] | Japan | 7-81882 |
| Mar. 13, 1995 | [JP] | Japan | 7-81883 |
| Mar. 13, 1995 | [JP] | Japan | 7-81884 |
| Mar. 13, 1995 | [JP] | Japan | 7-81885 |
| Mar. 13, 1995 | [JP] | Japan | 7-81886 |
| Mar. 13, 1995 | [JP] | Japan | 7-81887 |
| Mar. 13, 1995 | [JP] | Japan | 7-81888 |
| Mar. 13, 1995 | [JP] | Japan | 7-81889 |
| Mar. 13, 1995 | [JP] | Japan | 7-81890 |
| Mar. 13, 1995 | [JP] | Japan | 7-81891 |
| Mar. 13, 1995 | [JP] | Japan | 7-81892 |
| Mar. 13, 1995 | [JP] | Japan | 7-81893 |
| Mar. 13, 1995 | [JP] | Japan | 7-81894 |
| Mar. 13, 1995 | [JP] | Japan | 7-81895 |
| Apr. 13, 1995 | [JP] | Japan | 7-113830 |
| Apr. 13, 1995 | [JP] | Japan | 7-113832 |
| Apr. 28, 1995 | [JP] | Japan | 7-128990 |
| May 31, 1995 | [JP] | Japan | 7-158343 |
| May 31, 1995 | [JP] | Japan | 7-158346 |
| Jan. 11, 1996 | [JP] | Japan | 8-3028 |

[51] Int. Cl.[6] ............................ B29C 45/33; B29C 45/40
[52] U.S. Cl. ...................... 264/238; 264/318; 264/297.2; 264/328.8; 264/334; 425/556
[58] Field of Search .................................... 264/238, 318, 264/328.1, 334, 297.2, 297.8, 328.8; 425/556, 577, 588, 572, 441, DIG. 58, 330

[56] References Cited

U.S. PATENT DOCUMENTS

| 4,340,352 | 7/1982 | Hayberg | 264/238 |
| 5,037,597 | 8/1991 | McGinley et al. | 264/238 |
| 5,200,132 | 4/1993 | Shfaram et al. | 264/238 |

(List continued on next page.)

FOREIGN PATENT DOCUMENTS

| 0 468 148 | 1/1992 | European Pat. Off. |
| 0 540 008 | 5/1993 | European Pat. Off. |
| 39 26 682 | 2/1991 | Germany . |

(List continued on next page.)

OTHER PUBLICATIONS

English–language abstract of JP 05–200772, Patent Abstracts of Japan, vol. 017, No. 635 (M–1514), Nov. 25, 1993.
English–language abstract of JP 60–006423, Patent Abstracts of Japan, vol. 009, No. 121 (M–382), May 25, 1985.
English–language abstract of JP 60–189431, Patent Abstracts of Japan, vol. 010, No. 033 (M–452), Feb. 8, 1986.

*Primary Examiner*—Jill L. Heitbrink
*Attorney, Agent, or Firm*—Oliff & Berridge, PLC

[57] ABSTRACT

A moving mold 100 consisting of slidable housing molds 110 and 110 and retainer molds 120 and 120 and a fixed mold 200 pairing with the moving mold 100 are used to mold a housing 20 and retainers 30a and 30b in resin at the same time. When the fixed mold 200 and the moving mold 100 are opened, the housing molds 110 and 110 are opened and a space is formed between the housing 20 and the retainers 30a and 30b to be fitted to each other. The retainers 30a and 30b are pressed against the housing 20 with the retainers 30a and 30b held in the retainer molds 120 and 120 from both the left and right sides, whereby the housing 20 and the retainers 30a and 30b are assembled.

9 Claims, 21 Drawing Sheets

U.S. PATENT DOCUMENTS

| | | | |
|---|---|---|---|
| 5,326,287 | 7/1994 | Hamakita et al. | |
| 5,348,461 | 9/1994 | Nishada et al. | 425/556 |
| 5,366,683 | 11/1994 | Cibin | 264/238 |
| 5,378,422 | 1/1995 | Musiel et al. | 425/556 |
| 5,512,228 | 4/1996 | Adams et al. | 264/238 |
| 5,618,207 | 4/1997 | Maejima | |
| 5,709,831 | 1/1998 | Endo et al. | 264/238 |

FOREIGN PATENT DOCUMENTS

| | | |
|---|---|---|
| 57-135133 | 8/1982 | Japan . |
| 60-006423 | 1/1985 | Japan . |
| 2-29011 | 6/1990 | Japan . |
| 5-200772 | 8/1993 | Japan . |
| 7-156187 | 6/1995 | Japan . |

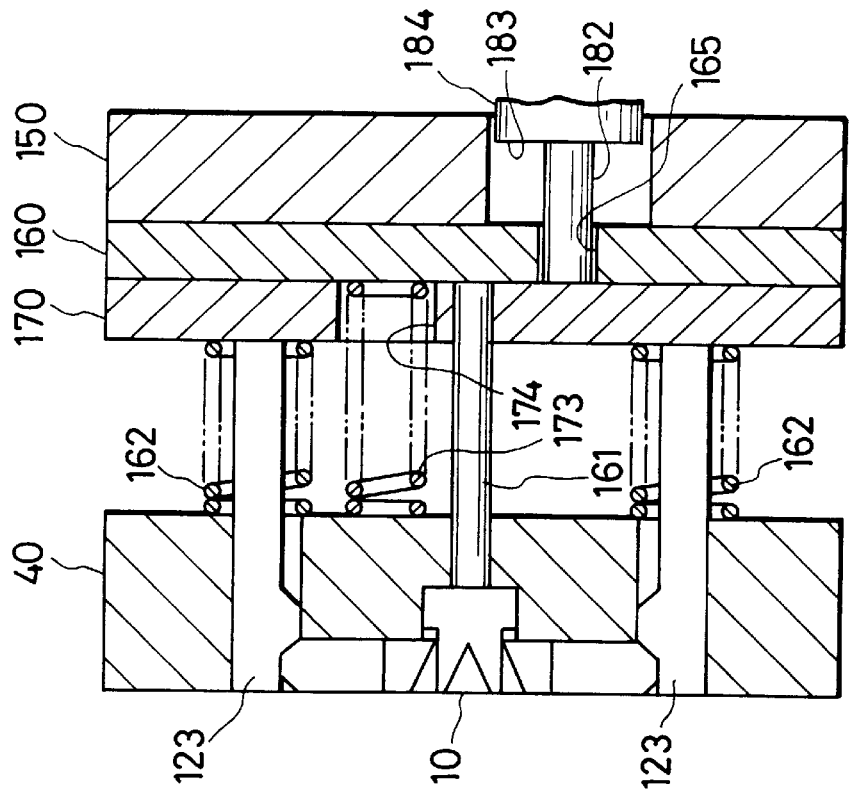
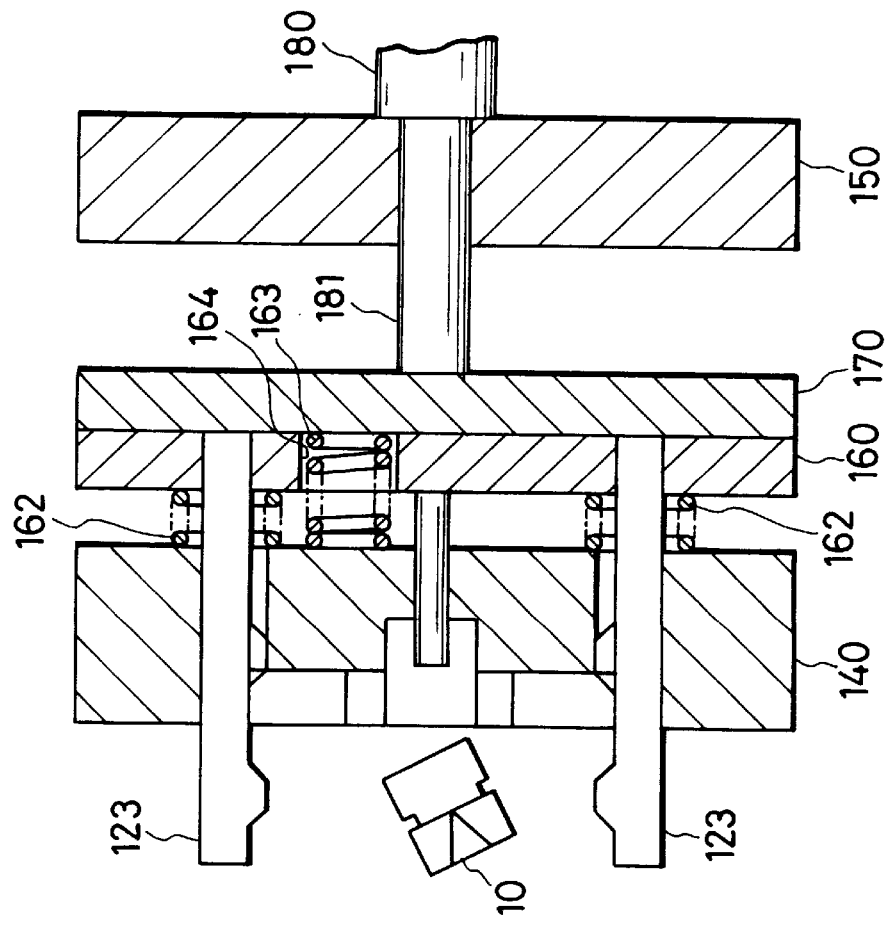

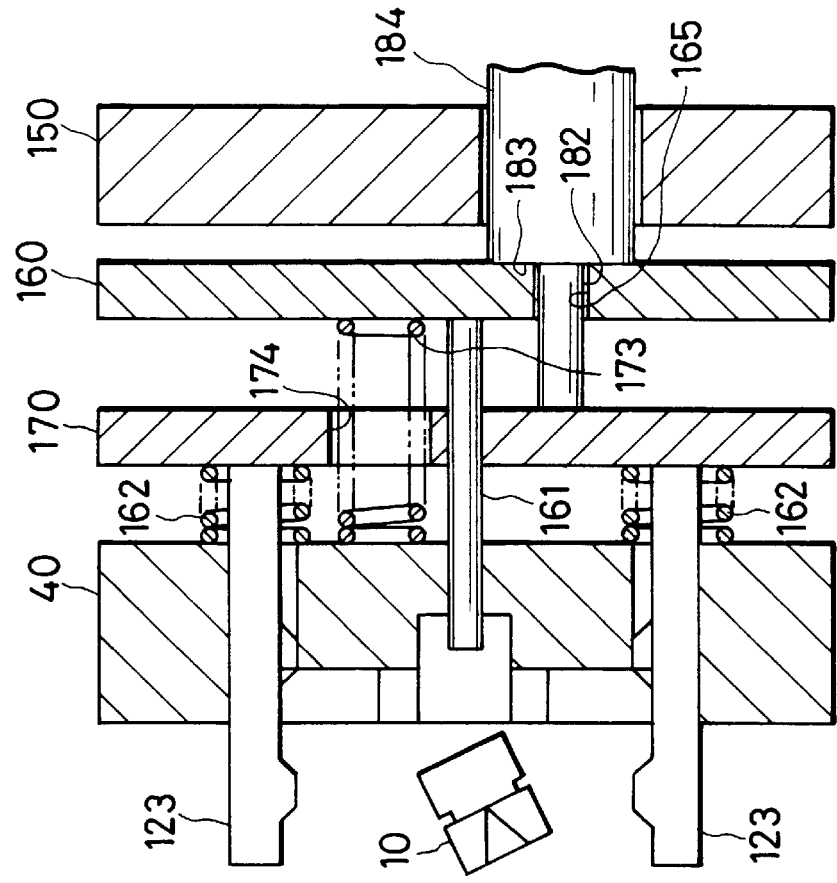
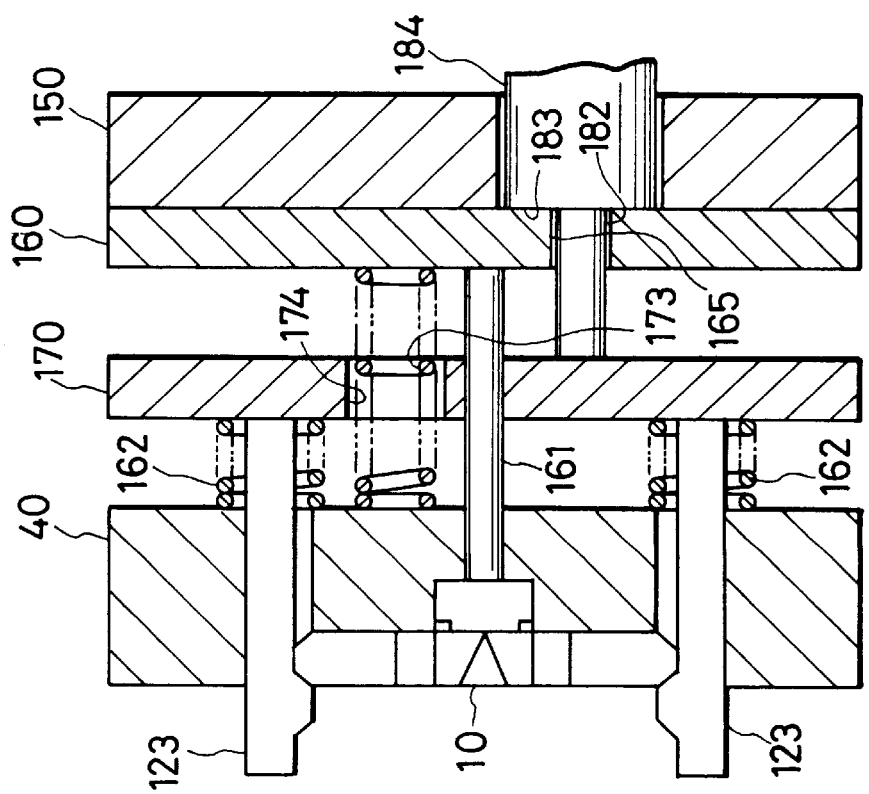

MANUFACTURING METHOD OF RESIN MOLDED ASSEMBLY

This is a Division of application Ser. No. 08/613,391 filed Mar. 7, 1996 now U.S. Pat. No. 5,814,356. The entire disclosure of the prior application is hereby incorporated by reference herein in its entirety.

BACKGROUND OF THE INVENTION

1. Field of the Invention

This invention relates to a manufacturing metal mold and a manufacturing method of a resin molded assembly into which a plurality of resin molded articles are engaged and assembled, and a resin molded assembly manufactured thereby.

2. Description of the Related Art

For example, to manufacture a resin molded assembly into which a plurality of resin molded articles are engaged and assembled, the resin molded articles are produced by separate resin molding machines and the produced resin molded articles are collected at one place for assembly by automated equipment provided with a parts feeder or by human hands.

To manufacture a resin molded assembly by the conventional method as described above, the following problems arise:

To perform resin molding and assembling separately, a step of transporting resin molded articles to an assembling place and an assembling step at the place are required regardless of whether the resin molded articles are assembled by automated equipment or human hands. Assembling the resin molded articles by human hands requires an additional inspection step. These steps will increase the manufacturing costs. Metal mold management, etc., is required for each resin molded article and is burdensome.

SUMMARY OF THE INVENTION

It is therefore an object of the invention to provide a manufacturing metal mold and a metal mold manufacturing method whereby resin molded articles can be manufactured accurately at low costs.

According to a first aspect of the invention, there is provided a manufacturing metal mold for molding a plurality of resin molded articles that are to be fitted to each other to assemble a resin molded assembly, in that the metal mold comprises a first structure for moving a metal mold located between resin molded articles to be fitted to each other to form a space, and a second structure, with a first resin molded article held, for relatively moving a second resin molded article to fit with the first resin molded article.

In the above-described manufacturing metal mold of the invention, a plurality of resin molded articles are molded in one metal mold, the first structure is used to move the metal mold located between the resin molded articles to be fitted to each other, and the second structure is used to, with a first resin molded article held, relatively move a second resin molded article to fit with the first resin molded article.

Further, according to the invention, there is provided a manufacturing metal mold for molding a plurality of resin molded articles that are to be fitted to each other to assemble a resin molded assembly. The metal mold comprises: a first structure for opening a fixed mold and a moving mold to form a space between resin molded articles; and a second structure, with a first resin molded article being held, for relatively moving a second resin molded article to fit with the first resin molded article.

In the above-described manufacturing metal mold of the invention, a plurality of resin molded articles are molded in one metal mold, the first structure is used to form a space between resin molded articles by opening the fixed mold and the moving mold, and the second structure is used to, with a first resin molded article held, relatively move a second resin molded article to fit with the first resin molded article.

Furthermore, according to the invention, there are provided a manufacturing metal mold for molding a plurality of resin molded articles that are to be fitted to each other to assemble a resin molded assembly, in that the metal mold comprises a first structure for moving a metal mold located between resin molded articles to be fitted to each other to form a space; a second structure, with a first resin molded article held, for moving a second resin molded article held toward the first resin molded article and pressing the second resin molded article against the first resin molded article to fit the resin molded articles to each other, and then retracting; and an extrusion structure for extruding the first resin molded article from the metal mold after the retracting of the second structure.

In the above-described manufacturing metal mold of the invention, a plurality of resin molded articles are molded in one metal mold. The first structure is used to move the metal mold located between resin molded articles to be fitted to each other to form a space and with a first resin molded article fixed, the second structure is used to move a second resin molded article held toward the first resin molded article. The second resin molded article is moved and pressed against the first resin molded article to fit with the resin molded articles to each other, then the second structure retracts. After this, the extrusion structure extrudes the first resin molded article from the metal mold. At this time, the second structure, which retracts, does not interfere.

Moreover, according to the invention, there are provided a manufacturing metal mold for a resin molded assembly by fitting a plurality of resin molded articles to each other, in that the manufacturing metal mold comprises a pair of metal molds to mold a plurality of resin molded articles, one of the metal mold being movable relative to the other metal mold, one of said metal molds including a slidable mold in a direction perpendicular to a direction of movement of the movable mold, and an assembling mechanism for moving said slidable mold located between a first resin molded article and a second resin molded article during fastening the pair of the metal molds to form a space, and moving the slidable mold, with the first resin molded article held, for pressing the second resin molded article against the first resin molded article to be fitted to each other.

In the above-described manufacturing metal mold of the invention, to mold a plurality of resin molded articles in one metal mold, a slidable mold located between first resin mold article and a second resin molded article is moved to form a space. That is, the opposite face to the mated resin molded article is molded by the slidable mold before the space is formed by moving the slidable mold. After this, with the first resin molded article held, the second resin molded article is moved in the space to press the second molded article to fit with each other.

Furthermore, in the present invention, an undercut in the metal mold may be formed to hold the resin molded article. When the metal mold is moved to form the space, the resin molded article is not dropped or out of place by the undercut. Moreover, if the metal mold moved by the second structure presses the resin molded article from the rear at a position off a bending piece when the resin molded articles are fitted to each other, the portion off the metal mold also becomes the bending piece, increasing the bending portion and enabling more easy bending. Still further, the second structure moves the metal mold while sliding the resin molded article on the slide face along the move direction.

Moreover, the metal mold moved by the second structure may be formed with a level difference projecting toward the move direction for holding the resin molded article on a stereoscopic face to prevent an inclined motion. Furthermore, when the second resin molded article is moved toward the first resin molded article, the resin molded article may be floated from the surrounding wall face and moved. It does not make sliding contact with the surrounding wall face and is moved.

According to the second aspect of the present invention, there are provided a method of manufacturing a resin molded assembly by fitting a plurality of resin molded articles to each other, said method comprising the steps of: molding a plurality of resin molded articles in a metal mold; forming a space between first and second resin molded articles; and relatively moving the second resin molded article, with the resin molded article held, to fit the second resin molded article to the first resin molded article to assemble the resin molded assembly.

In the above-described manufacturing method of the invention, a plurality of resin molded articles are molded in one metal mold, with a first resin molded article held, the metal mold is moved to form a space, and a second resin molded article is moved to fit with the first resin molded article.

Further, according to the invention, there is provided a method of manufacturing a resin molded assembly by fitting a plurality of resin molded articles to each other, the method comprising the steps of: molding a plurality of resin molded articles in a metal mold; opening a fixed mold and a moving mold to form a space between resin molded articles; and relatively moving a second resin molded article, with first resin molded article held, to fit with the first resin molded article to assemble the resin mold assembly.

In the above-described manufacturing method of the invention, a plurality of resin molded articles are molded in one metal mold, a space is formed between resin molded articles by opening the fixed mold and the moving mold, and with a first resin molded article held, a second resin molded article is moved in the space to fit with the first resin molded article.

Furthermore, according to the invention, there are provided a method of manufacturing a resin molded assembly by fitting a plurality of resin molded articles to each other, the method comprising the steps of: molding a plurality of resin molded articles in a metal mold; forming a space between a first and second resin molded articles, moving the second resin molded article held by a moving mold toward the first resin molded article; pressing the second resin molded article against the first resin molded article to fit the resin molded articles to each other; retracting the moving mold; and extruding the first resin molded article from the metal mold.

In the above-described manufacturing method of the invention, a plurality of resin molded articles are molded in a metal mold and a space is formed between first and second resin molded articles. Then, with the first resin molded article held, the second resin molded article held in the moving mold is moved toward the first resin molded article and is pressed against the first resin molded article to fit the resin molded articles to each other. Then, the moving mold is retracted. After the retracting, the one resin molded article is extruded from the metal mold.

Moreover, according to the invention, there is provided a method of manufacturing a resin molded assembly by fitting a plurality of resin molded articles to each other, the method comprising the steps of: molding a plurality of resin molded articles in a metal mold; moving a slidable mold located between a first resin molded article and a second resin molded article to form a space during fastening a fixed mold and a moving mold; moving the slidable metal mold, with the one resin molded article held, for pressing the second resin molded article against the first resin molded article to fit the resin molded articles to each other.

In the above-described manufacturing method of the invention, to move the metal mold for forming a space, the fixed mold and the moving mold as the main body is being fastened. Therefore, even if a space is formed between the relatively moved resin molded articles, a complete space is not formed in the surroundings and the resin molded articles are easily held from the surroundings during the fitting. After preremoval, another mold opening may be required depending on the resin molded article form. Also in such a case, after the preceding removal plate is moved, the resin molded articles are moved and fitted to each other before the molds are opened.

Furthermore, in the present invention, an undercut in the metal mold may be formed to hold the resin molded article. When the metal mold is moved to form the space, the resin molded article is not dropped or out of place by the undercut. Moreover, if the metal mold moved by the second structure presses the resin molded article from the rear at a position off a bending piece when the resin molded articles are fitted to each other, the portion off the metal mold also becomes the bending piece, increasing the bending portion and enabling more easy bending. Still further, the second structure moves the metal mold while sliding the resin molded article on the slide face along the move direction.

Moreover, the metal mold moved by the second structure may be formed with a level difference projecting toward the move direction for holding the resin molded article on a stereoscopic face to prevent an inclined motion. Furthermore, when the second resin molded article is moved toward the first resin molded article, the resin molded article may be floated from the surrounding wall face and moved. It does not make sliding contact with the surrounding wall face and is moved.

According to the third aspect of the present invention, there are provided a resin molded assembly produced by fitting a plurality of resin molded articles to each other, said assembly being produced by the steps of: molding a plurality of resin molded articles in a metal mold; moving the metal mold located between first and second resin molded articles to forming a space; and moving a slidable mold, with the one resin molded article held, to press the second resin molded article against the resin molded article to fit the resin molded articles to each other.

In the above-described a resin molded assembly, to mold a plurality of resin molded articles in one metal mold, metal mold between first and second resin molded article is moved to form a space. That is, the opposite face to the mated resin molded article is molded by the metal mold before the space is formed by moving the metal mold, and the space is formed by moving the metal mold. After this, with the first resin molded article held, the second resin molded article is moved to press the resin molded articles against each other to fit each other.

According to the invention, the resin molded assembly may comprise a connector hosing and a retainer, the retainer fitted sladably back and forth to an outer face of a rear end in the connector housing, in that the retainer is made not project from a rear end face of the housing.

In the above-described resin mold assembly, the retainer fitted slidably back and forth to the outer face of the rear end of the housing does not project from the rear end face of the housing. The housing receives drop shock regardless of which side dropping occurs from, preventing the retainer from making the transition from the provisional lock state to the complete lock state by shock.

According to the invention, a resin molded assembly may comprise a connector hosing and a retainer, the retainer having a U-shape in cross section to sandwich a trunk part of the connector housing, in that a notch is made in roots of wings of the U-shape of the cross section of the retainer.

In the above-described resin mold assembly, a notch is made in the roots of the wings of the retainer shaped like U in cross section for easy bending. When the retainer is mounted so as to sandwich the trunk part of the housing, it is easily bent and fitted.

As described above, since resin molded articles are assembled in a metal mold in the invention, they can be molded in resin and assembled by one machine at the same time; the resin molded assembly manufacturing method having the following effects can be provided:

The transport step becomes unnecessary. As compared with use of automated equipment, the need for supplying parts by a parts feeder is eliminated and the assembly step time can be reduced. As compared with assembly by human hands, because of automation, drastic time reduction is accomplished, and another inspection step for human hands becomes unnecessary. Since separate automated equipment is not required, the work space can be reduced and the automated equipment installation costs can also be decreased. Resultantly, resin molded assemblies can be manufactured at low costs.

Particularly, a space required for moving resin molded articles is formed by opening the fixed mold and the moving mold as usual, whereby the structure can be simplified. If the slide pin is moved as required, a space that cannot be provided simply by opening the fixed and moving molds can also be formed.

When with one resin molded article fixed, a different resin molded article is made to approach from the surroundings of the one resin molded article for fitting them to each other for assembly, the move mold may interfere when a finished resin molded assembly is taken out. In such a case, if the mold is reciprocated for retraction, it does not interfere. Particularly, when the resin molded article is moved while the fixed and molded molds are opened for forming a space, if the slide mold is reciprocated, the slide mold retracts already at the termination of the mold opening, and good extrusion can be performed.

The resin molded articles to be fitted for assembly are held and moved within a predetermined space; they do not drop in the space and are not out of place because the undercut part is formed.

The press position is placed off the bending piece and the bending piece is made to more easily bend, whereby when the resin molded articles are pressed against each other for assembly, they are not broken.

In the invention, after resin molded articles are molded in the metal mold, metal mold is moved for forming a space between paired resin molded articles and is moved for fitting the resin molded articles to each other. Thus, they are also assembled in the metal mold; the resin molding and assembling steps are performed by one machine at the same time. The resin molded assembly manufacturing metal and manufacturing method having the following effects can be provided:

The transport step becomes unnecessary. As compared with use of automated equipment, the need for supplying parts by a parts feeder is eliminated and the assembly step time can be reduced. As compared with assembly by human hands, because of automation, drastic time reduction is accomplished, and another inspection step for human hands becomes unnecessary. Since separate automated equipment is not required, the work space can be reduced and the automated equipment installation costs can also be decreased. Resultantly, resin molded assemblies can be manufactured at low costs.

Since the metal mold is moved for forming a space during fastening the fixed and moving molds, the resin molded articles can be easily held and be prevented from dropping, and the resin molded articles requiring so-called preremoval can also be easily assembled.

By the way, if a resin molded article is moved in an unstable condition, it may be inclined midway; if it is pressed against another resin molded article, it cannot be fitted thereto. However, according to the invention, resin molded articles are moved while they slide along the slide face in the move direction, thus do not become unstable and are not inclined either during the move.

Further, according to the invention, a level difference is formed, whereby the resin molded article comes in contact with a stereoscopic face; as compared with the case where it comes in contact with a simple plane and is held, it becomes stable and is not inclined during the move.

By the way, dust must not occur in the metal mold and when resin molded articles are moved, shavings must be prevented from occurring. According to the invention, the resin molded article is also moved in a floating condition from the surrounding wall face owing to the level difference; shavings can be prevented from occurring and a highly accurate product can be molded.

BRIEF DESCRIPTION OF THE DRAWING

In the accompanying drawings:

FIG. 22 is a schematic sectional view of the moving mold showing a state in which a second protrusion plate is driven;

FIG. 23 is a schematic sectional view of a moving mold according to another modified form of the third embodiment;

FIG. 24 is a schematic sectional view showing a state in which a first protrusion plate is driven in the moving mold in FIG. 23;

FIG. 25 is a schematic sectional view showing a state in which a second protrusion plate is driven in the moving mold in FIG. 23;

DESCRIPTION OF THE PREFERRED EMBODIMENTS

Referring now to the accompanying drawings, there are shown preferred embodiments of the invention.

First Embodiment

Figure 1:
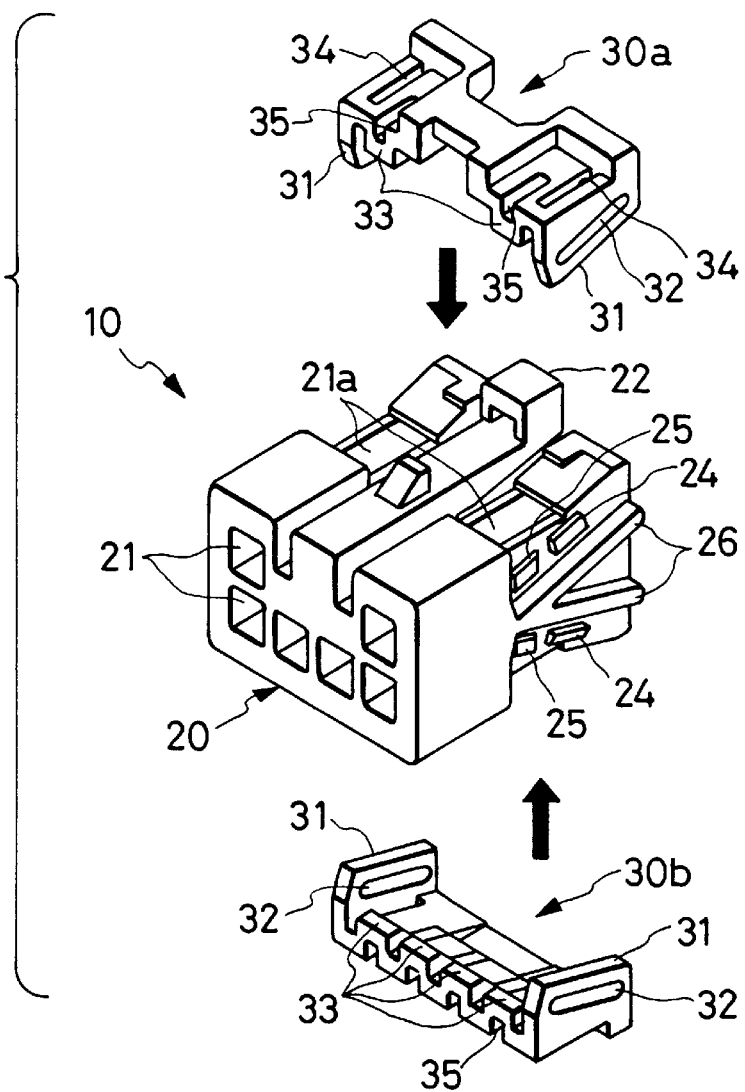
FIG. 1 is a perspective view in a disassembled state of a resin molded assembly manufactured by applying a manufacturing metal mold and a manufacturing method according to a first embodiment of the invention.
Figure 2:
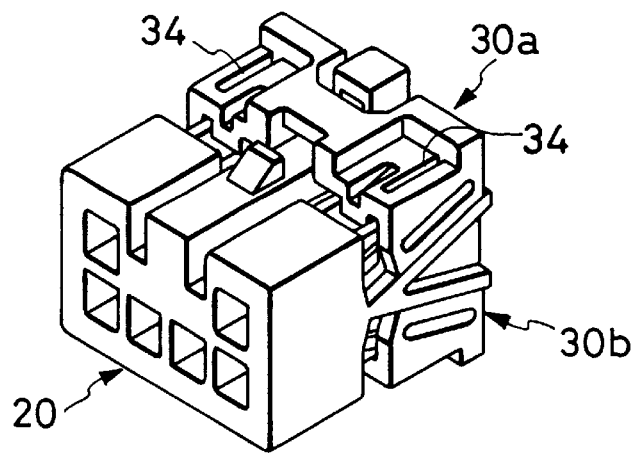
FIG. 2 is a perspective view of the resin molded assembly in an assembly state.

FIGS. 1 and 2 are perspective views of a resin molded assembly to which a manufacturing metal mold and a manufacturing method of a resin molded assembly are applied according to a first embodiment of the invention.

In the figures, the resin molded assembly (connector) 10 consists of a housing 20 shaped like a rectangular box and retainers 30a and 30b shaped like a U in cross section fitted to the top face and bottom face of the housing 20. The housing 20 is formed with cylindrical terminal metal fitting storage chambers 21 passing through back and fourth, two at the upper stage and four at the lower stage. The chambers at the upper stage are formed on left and right sides of the housing with an upward and downward flexible lock arm 22 at the center. The outer form of the portion from the middle to the rear end at the housing 20 is made a size smaller as compared with the front end. Each terminal metal fitting storage chamber 21 is formed with an opening 21a facing upward and downward in the vicinity of the front end of the narrow portion.

To attach the retainers 30a and 30b shaped like a U in cross section to the narrow portion from the top and bottom face sides, a total of four guide rails 24 shaped like ridges are formed on both side faces corresponding to the upper and lower retainers. The guide rail 24 is formed slantingly toward the vertical middle as it goes to the front end on the side face. The cross section of each upper guide rail 24 is provided with an oblique slope facing upward and that of each lower guide rail 24 is a wedge shape having an oblique slope facing downward.

A small protrusion 25 is formed ahead on an extension to the guide rail 24. Formed on the furthermore inner side from the guide rail 24 and the small protrusion 25 is a jetty 26 parallel with their inclination and protruding to the same width of the front end portion. The upper jetty 26 and the lower jetty 26 are connected on the front, forming a V letter.

The retainers 30a and 30b are made generally symmetrical as a whole and when U-shaped openings are made near toward the housing 20, both wings 31 and 31 sandwich the narrow portion of the housing 20 from both sides. The wing 31 is formed with a guide groove 32 as a width allowing the corresponding guide rail 24 and small protrusion 25 to be inserted in similar inclination. The lower end of the wing 31 is formed slantingly so as to be along the V-shaped jetty 26.

The retainers 30a and 30b are made shorter than the narrow portion of the housing. Therefore, if the retainers 30a and 30b are attached to the housing 20 so as to sandwich the housing 20 therebetween from the top face side and bottom face side, the guide rails 24 enter the guide grooves 32 and can be slid back and forth and both are formed slantingly, so that the retainers 30a and 30b are made close to or away from the housing 20 while moving back and forth. The small protrusions 25 enter the guide grooves 32 at the front ends in the move range. The retainers 30a and 30b do not protrude from the rear end of the housing 20 even within the movable range.

The upper retainer 30a and the lower retainer 30b are provided with two and four protrusions 33, respectively, that can enter the opening 21a at positions facing the opening 21a on the inner face side facing the housing 20. The protrusion 33 is formed as a wedge shape protruding as it goes forward so that it is locked in an internal terminal metal fitting (not shown) for removal prevention when the protrusion 33 enters the corresponding terminal metal fitting storage chamber 21. When the retainer 30a, 30b is slid back and forth and almost approaches the housing 20 at the front end as described above, the protrusions 33 enter the terminal metal fitting storage chambers 21 via the opening 21a. If the terminal metal fitting is in a half insertion condition, the protrusion 33 abuts the end face of the terminal metal fitting for moving it to the regular insertion position. Grooved recesses 35 are made in the opposite face to the protrusions 33 and are formed as an undercut shape wider as going to the depth. Notches 34 and 34 are made in the roots of the wings 31 and 31, whereby the roots of the wings 31 and 31 are made more flexible.

Figure 10:
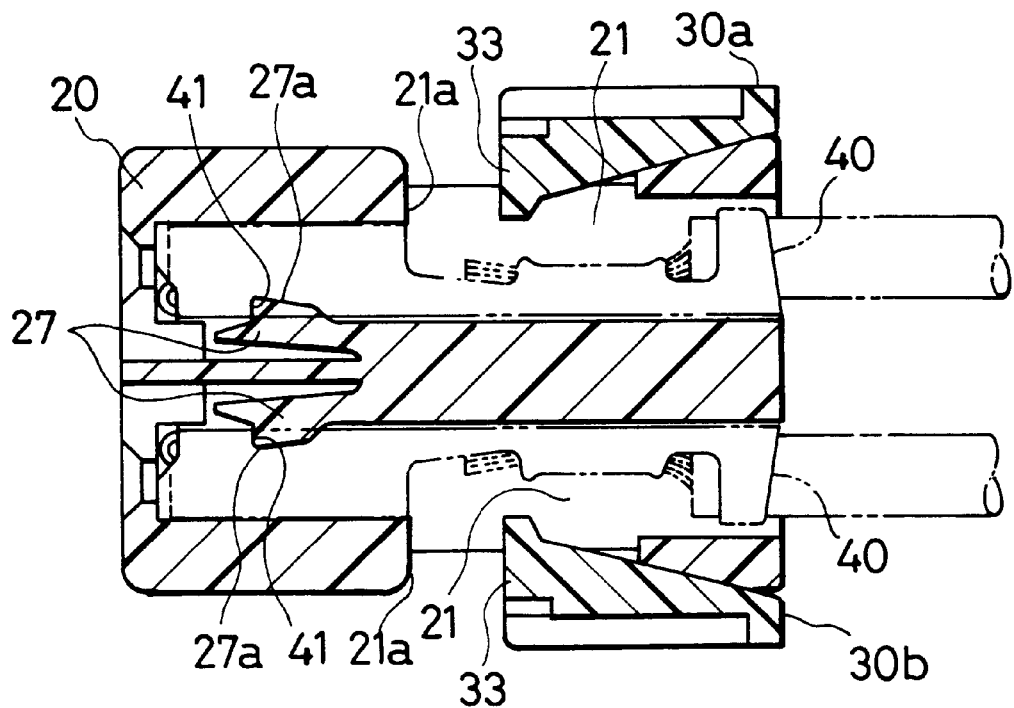
FIG. 10 is a sectional view of the resin molded assembly showing a provisional lock state of the retainer.
Figure 11:
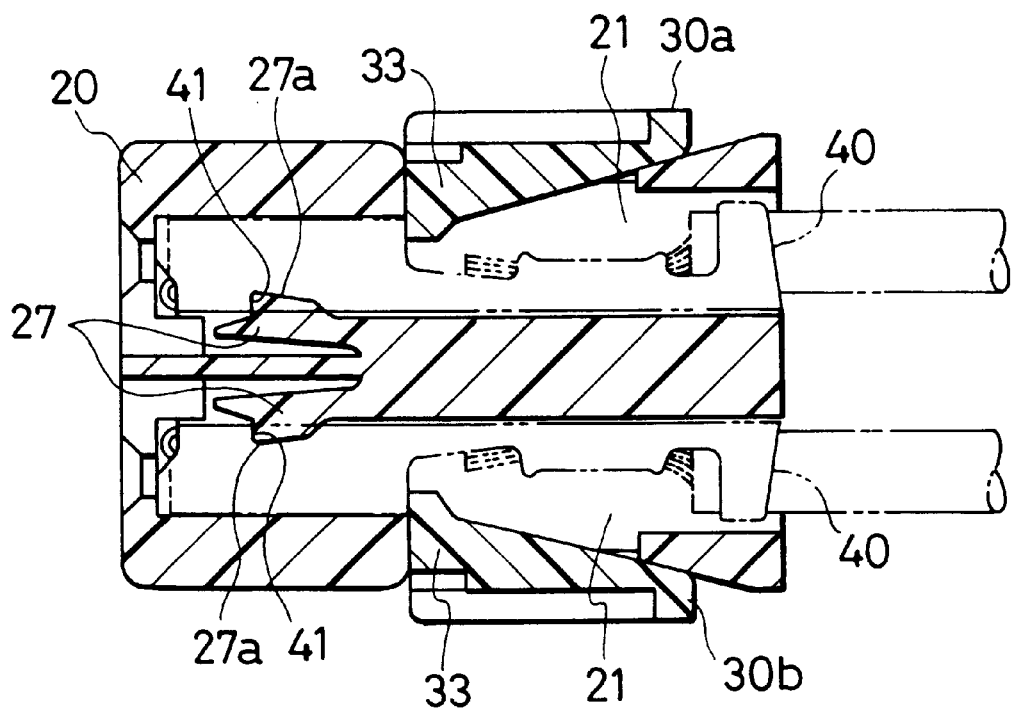
FIG. 11 is a sectional view of the resin molded assembly showing a complete lock state of the retainer.
Figure 12:
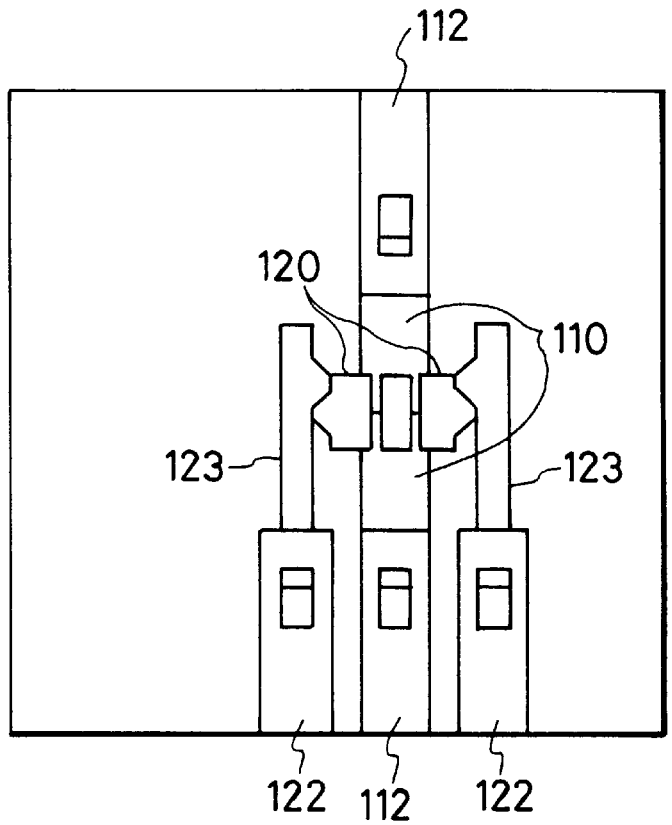
FIG. 12 is a front view of a moving mold according to a third embodiment of the invention.

FIGS. 10 and 11 are sectional views showing how the retainers 30a and 30b provide double lock. A resin lance 27 integrally molded is formed on the bottom of each terminal metal fitting storage chamber 21 in the housing 20 and when a female terminal metal fitting 40 is inserted, a protrusion 27a formed on the top face of the resin lance 27 enters a lock hole 41 made in the bottom of the female terminal metal fitting 40 and is locked therein (primary lock). At this time, the retainer 30a, 30b is positioned at the rear end in the move range and a projection 33 does not enter the terminal metal fitting storage chamber 21.

Next, when the retainer 30a, 30b moves to the front end, it approaches the housing 20 and the projection 33 enters the terminal metal fitting storage chamber 21 via the opening 21a and is locked in the female terminal metal fitting 40 (secondary lock). The state in which the retainer 30a, 30b is in the rear end position is called a provisional lock state and the state in which the retainer 30a, 30b is in the front end position is called a complete lock state.

Figure 3:
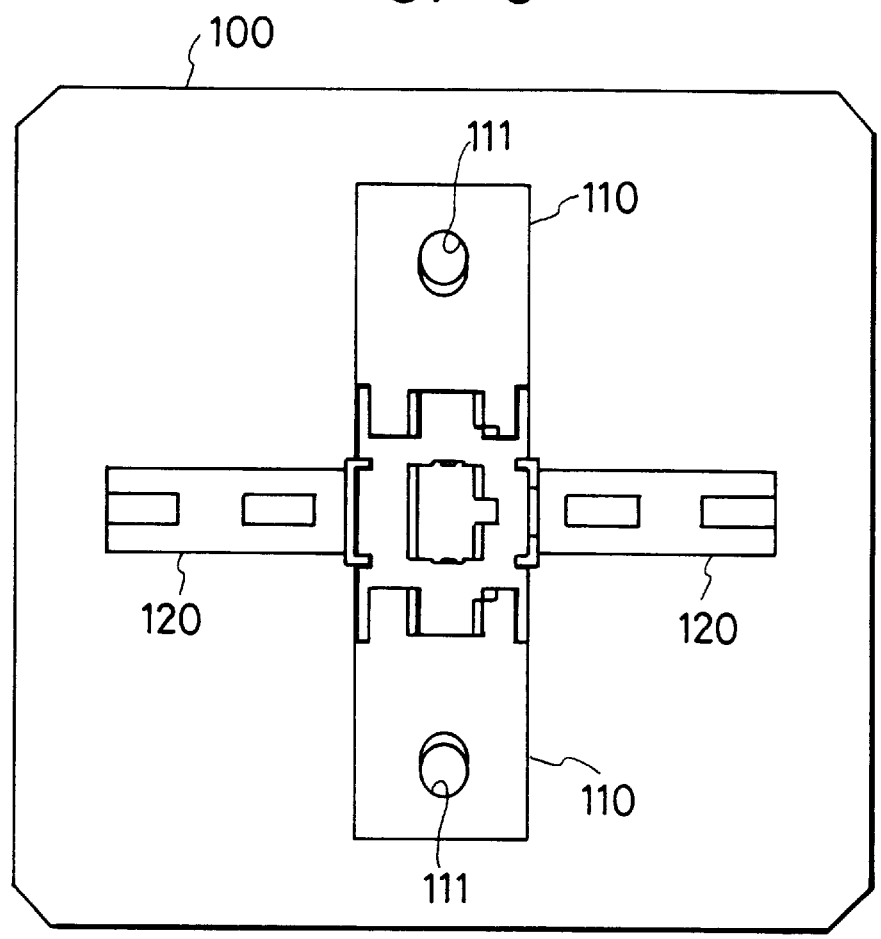
FIG. 3 is a front view of a moving mold of a metal mold for manufacturing the resin molded assembly.

On the other hand, FIG. 3 is a front view of a moving mold of a metal mold for manufacturing the resin molded assembly 10. The moving mold 100 shown in the figure pairs with a fixed mold 200 positioned on the front side in the paper plane. As shown in the figure, the moving mold 100 consists of housing molds (slide pins) 110 and 110 slidable up and down and capable of molding the housing 20 on the inner face side and retainer molds (assembly slide pins) 120 and 120 sliding in horizontal directions on the left and right of the housing molds 110 and 110. The housing mold 110, 110 forms the outer face of the wing 31, 31 of the retainer 30a, 30b in the portion facing and coming in contact with the retainer mold 120, 120. A part of the fixed mold 200 is entered in a space surrounded by the housing mold 110, 110 and the retainer mold 120, 120 for molding the retainer 30a, 30b. Therefore, a space is formed on the inner face side of the retainer mold 120, 120 simply by drawing out the fixed mold 200. This means that for a plurality of resin molded articles fitted to each other for assembly, the opposed face side of one resin molded article to its mated resin molded article is molded with no slide pin, whereby the metal mold structure can be simplified.

In the embodiment, the opposed face to the retainer 30a, 30b in the housing 20 is also molded by the housing mold 110, 110 up and down slidable, but may be molded on the side of the fixed mold 200, in which case the opposed face between the housing 20 and the retainer 30a, 30b can be formed simply by drawing out the fixed mold 200 and a space for moving the retainer 30a, 30b can be formed by opening the fixed mold 200 and the moving mold 100. As a result, the metal mold structure can be made simpler. In the embodiment, the housing molds 110 and the retainer molds 120, which are slide pins, are held in the moving mold 100, but may be held in the fixed mold 200.

As described above, the recess 35 of an undercut shape is made in the face opposed to the protrusion 33 in the retainer 30a, 30b, and the retainer mold 120, 120 is formed with a projection for forming the recess 35. The projection is made on the side of the retainer mold 120, 120 facing the housing mold 110, 110 and the retainer 30a, 30b is formed with the undercut part in this direction; resultantly, it does not drop to the side of the housing mold 110, 110.

The retainer mold 120, 120 is not formed over the full width of the retainer 30a, 30b and the wings 31 and 31, both ends of the retainer 30a, 30b, are off the retainer mold 120, 120. That is, the retainer mold 120, 120 presses the retainer 30a, 30b against the housing 20 at positions off the wings 31 and 31 which become bending pieces when the retainer 30a, 30b is fitted into the housing 20 for assembly.

Figure 4:
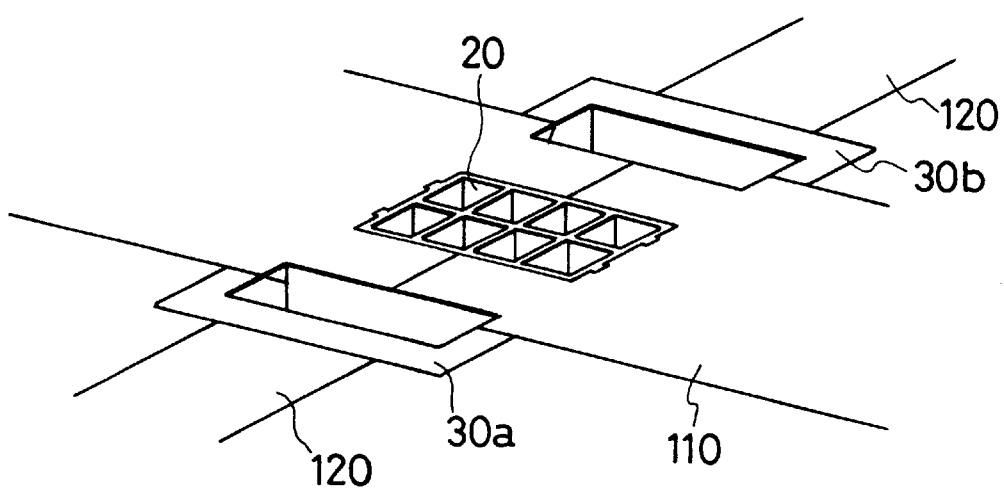
FIG. 4 is a schematic drawing showing a molding state in the metal mold when the resin molded assembly is manufactured.
Figure 5:
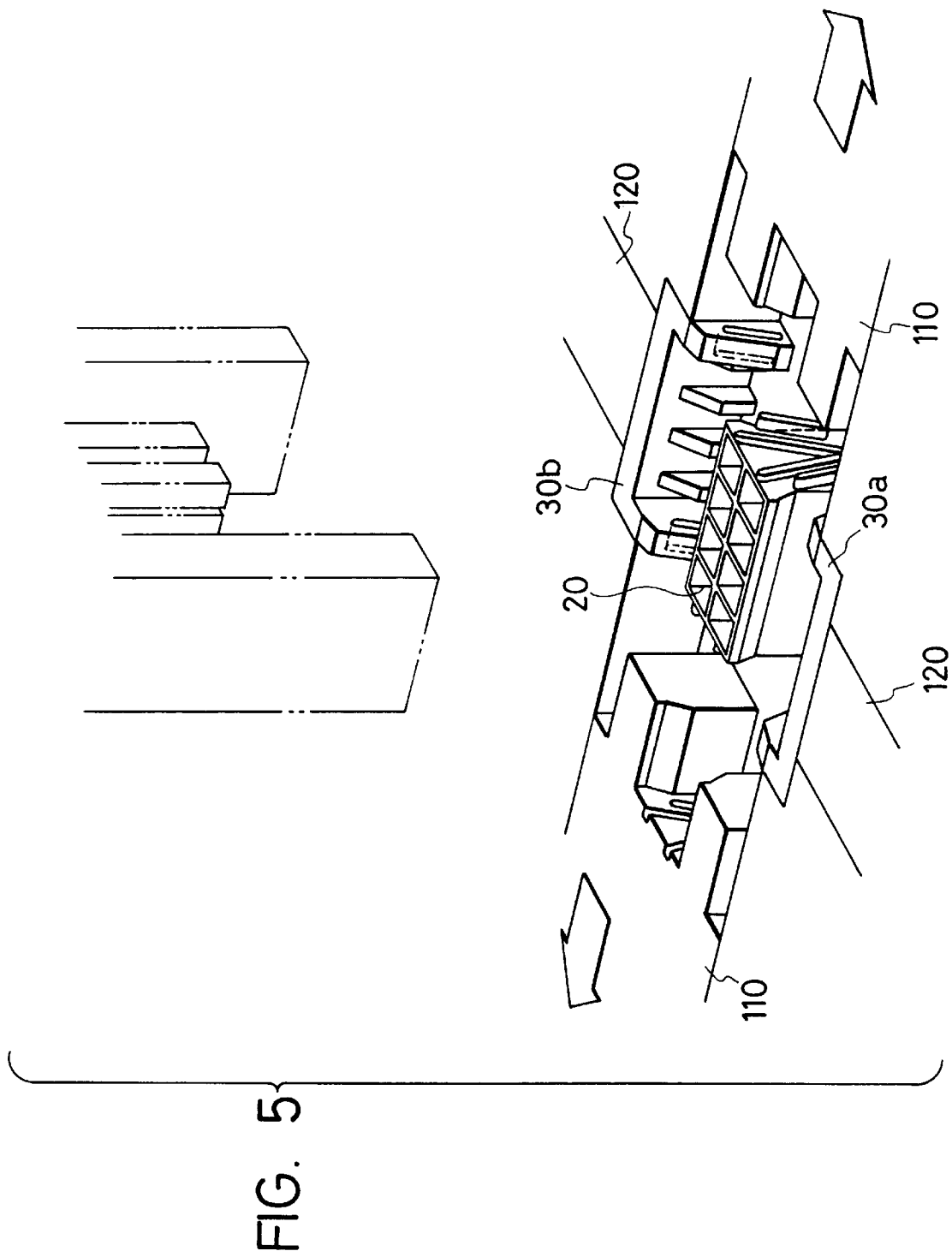
FIG. 5 is a schematic drawing showing a state in which housing molds of the moving mold are opened when the resin molded assembly is manufactured.
Figure 6:
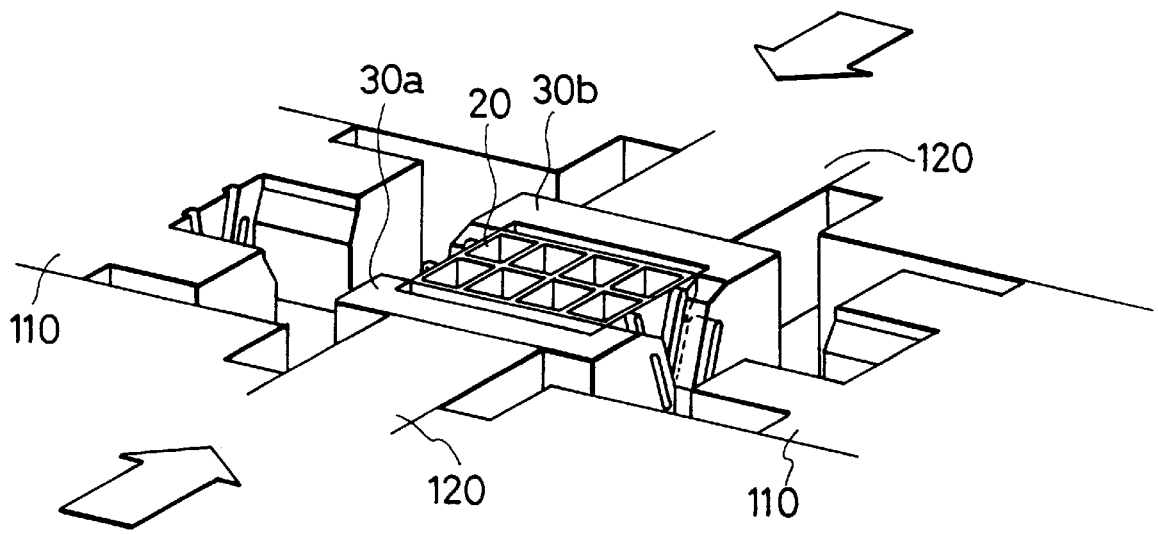
FIG. 6 is a schematic drawing showing a state in which retainers are engaged with a housing with retainer molds of the moving mold when the resin molded assembly is manufactured.

FIGS. 4–6 are schematic drawings showing how the slide pins move in the moving mold 100; they are only schematic views and do not correspond to the details of the resin molded assembly 10.

Figure 7:
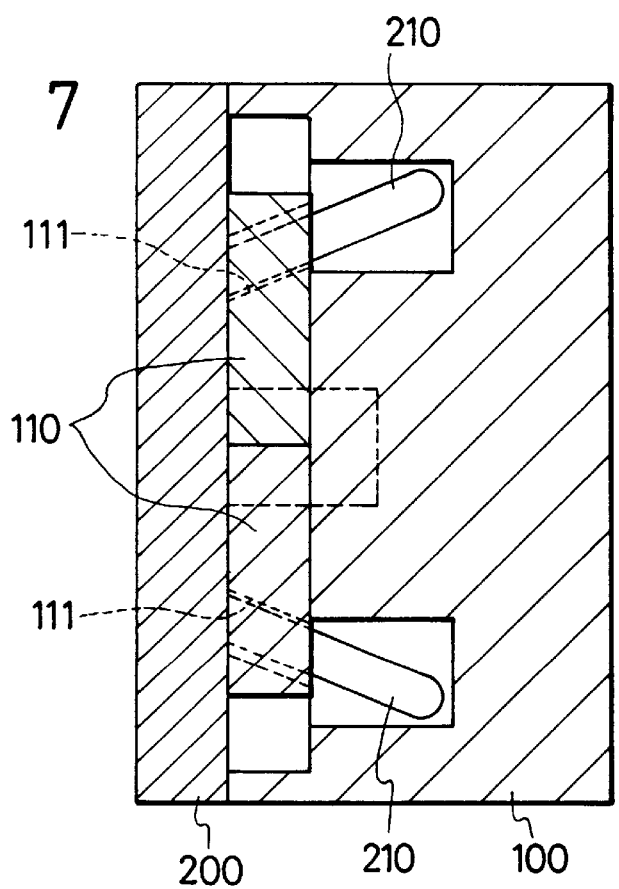
FIG. 7 is a schematic sectional view of a fixed mold and the moving mold showing a state in which the housing molds are closed.
Figure 8:
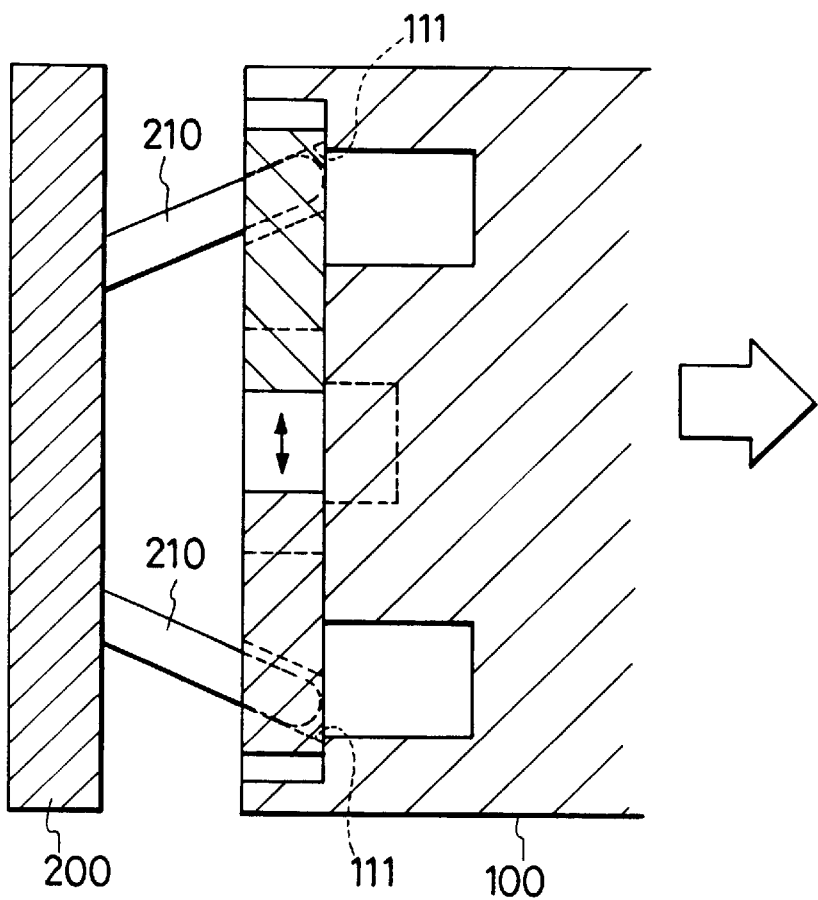
FIG. 8 is a schematic sectional view of the fixed mold and the moving mold showing a state in which the housing molds are open.

The housing molds 110 and 110 and the retainer molds 120 and 120 slide in such a manner that they approach or come off the core at the center of the moving mold 100. As shown in FIGS. 7 and 8, the housing mold 110, 110 is formed with a slant through hole 111, 111 to enable insertion of an angular pin 210, 210 formed so as to project to the moving mold 100 from the fixed mold 200. When the fixed mold 200 and the moving mold 100 relatively approach and come off each other at mold fastening and opening, the housing molds 110 and 110 also approach and come off each other. The diameter of the through hole 111, 111 is made longitudinally longer than that of the angular pin 210, 210, whereby the timing at which the moving mold 100 and the fixed mold 200 are opened and the timing at which the housing molds 110, 110 are opened can be made different. In the embodiment, opening the housing molds 110, 110 is started a little while after opening the moving mold 100 and the fixed mold 200 is started.

Figure 9:
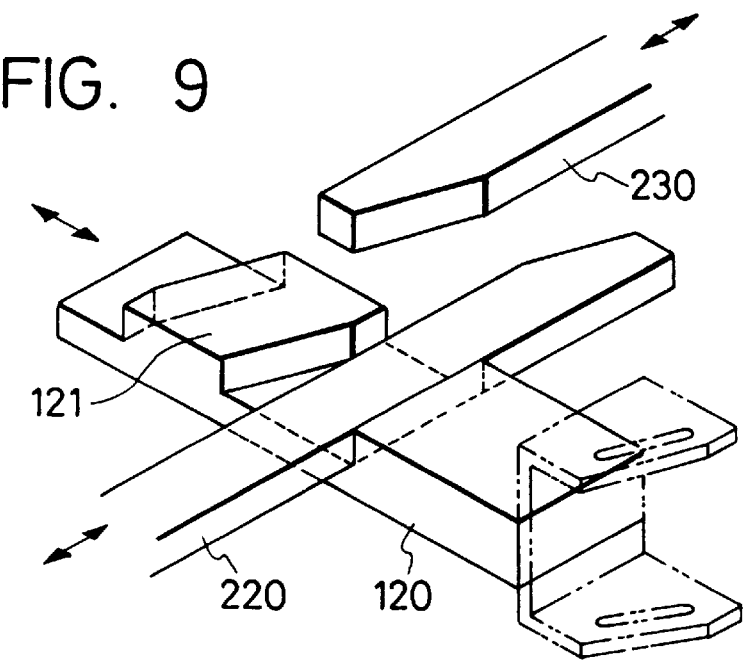
FIG. 9 is a schematic perspective view showing a retainer mold driving method.

On the other hand, for the retainer molds 120, 120, as shown in FIG. 9, a reset drive rod 220 projecting from the side of the fixed mold 200 and having an oblique slope at the tip and an engagement drive rod 230 projecting from the side of an extrusion pin (not shown) and having a slope slanting on the opposed side to the reset drive rod 220 at the tip can come in sliding contact with a cam 121 having a slope formed at the end of the retainer mold 120. Both the drive rods 220 and 230 are extruded at different timings, whereby the retainer mold 120 is reciprocated.

Next, a method of manufacturing the resin molded assembly 10 of the above-described structure with the metal mold of the above-described structure will be discussed.

At the beginning, in the moving mold 100, the housing molds 110 and 110 are in intimate contact with each other and the retainer molds 120 and 120 are in intimate contact with both sides of the housing molds 110 and 110 (FIG. 4). The fixed mold 200 is in intimate contact with the front of the moving mold 100 and projects to the insides of the terminal metal fitting storage chambers 21 and the inner face portions of the retainers 30a and 30b, the projections being schematically shown by the phantom lines in FIG. 5. When the metal mold is filled with molten resin, the resin is solidified between the fixed mold 200 and the moving mold 100 as shown in FIG. 4. When the fixed mold 200 and the moving mold 100 are opened after the solidification, the angular pins 210 abut the inner peripheral surfaces of the through holes 111 of the housing mold 110 with a little delay from the opening of the fixed mold 200 and the moving mold 100 and come out of the through holes 111. Accordingly, the housing molds 110 and 110 open mutually as shown in FIGS. 5 and 8. At this time, recesses and projections made in a direction perpendicular to the mold opening direction in the housing molds 110 and the retainer molds 120 engage the slide pins, thus the housing 20 and the retainers 30a and 30b are held in the moving mold 100, as shown in FIG. 5.

When the housing molds 110, 110 are opened by the slide operation between the inclined angular pins 210 and the through holes 111 in the mold opening step of the fixed mold 200 and the moving mold 100, the housing 20 is released on the top, bottom, left, and right faces and the front face. On the other hand, when the fixed mold 200 is drawn out from the moving mold 100, the inner faces of the retainers 30a and 30b left in the retainer molds 120 and 120 are completely exposed and the retainers 30a and 30b are held facing each other at both left and right so as to sandwich the housing 20 therebetween. At this time, as described above, the recesses 35 made in the retainers 30a and 30b are undercut shapes, thus preventing the retainers 30a and 30b from dropping in the released space.

After this, when driving the extrusion pin is started, the slope at the tip of the engagement drive rod 230 slides to the slope of the cam 121 of the retainer mold 120 and the retainer mold 120, 120 is moved to the housing 20. The retainers 30a and 30b are pressed against the top face and bottom face of the housing 20 from the opening in the U shape with the retainers 30a and 30b held in the retainer molds 120 and 120 as shown in FIG. 6. When the left and right wings 31 and 31 of each retainer 30a, 30b are made to approach the narrow portion of the housing 20 so as to sandwich the portion therebetween, the end faces of the wings 31 abut the guide rails 24. The wings 31, which are wedge-shaped in cross section as described above, climb over the guide rails 24. When the guide rails 24 are inserted into the guide grooves 32 of the wings 31 for engagement, the retainers 30a and 30b engage the housing 20. Assembling them is now complete. As the extrusion pin is driven, the assembling is complete and when the extrusion pin is furthermore driven, the housing 20 to which the retainers 30a and 30b are fitted is removed from the moving mold 100. Because of no undercut form for the projections 35 in the extrusion direction, reasonable extrusion is performed.

Thus, the moving mold 100 consisting of the slidable housing molds 110 and 110 and the retainer molds 120 and 120 and the fixed mold 200 pairing with the moving mold 100 are used to mold the housing 20 and the retainers 30a and 30b in resin at the same time. The fixed mold 200 and the moving mold 100 are opened and the housing molds 110 and 110 of the slide pins are opened. While a space is formed between the housing 20 and the retainers 30a and 30b to be fitted to each other, the retainers 30a and 30b are pressed against the housing 20 with the retainers 30a and 30b held in the retainer molds 120 and 120 from both the left and right sides, whereby the housing 20 and the retainers 30a and 30b are assembled. The recesses 35 of undercut form are made in the retainers 30a and 30b by means of the projections of the retainer molds 120 and 120 and the recesses and projections are engaged so as to prevent the retainers 30a and 30b from dropping in the released space or being out of place.

The retainer molds 120 and 120 press the retainers 30a and 30b at positions off the wings 31 which become bending pieces, whereby the portions off the retainer molds 120 and 120 also bend and the wings 31 outward for easy engagement.

Further, the wings 31 easily bend owing to the notches 34 made in the roots of the wings 31; they abut the guide rails 24 and outward. Resultantly, the wings 31 climb over the guide rails 24 without breakage and the guide rails 24 are inserted into the guide grooves 32 of the wings 31 for engagement.

The retainers 30a and 30b do not project from the rear end face of the housing 20. When the housing 20 is removed from the metal mold, even if the retainer 30a or 30b receives shock, a move from the provisional lock position to the complete lock position is not made.

In the embodiment, the housing molds 110 and the retainer molds 120 are moved in mechanical conjunction with a move of the fixed mold 200 and the moving mold 100 and a move of the extrusion pin, but can also be driven by hydraulic or air pressure or a motor. Space between resin molded articles can be formed not only by mold opening and a linear move of the slide pins, but also by two-dimensional or three-dimensional driving. Further, a plurality of slide pins may move resin molded articles in conjunction.

Second Embodiment

Next, the operation of a metal mold in a second embodiment of the invention will be discussed.

Figure 26:
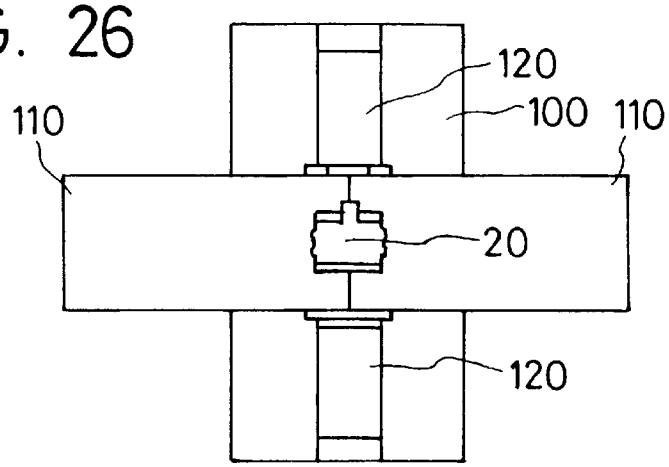
FIG. 26 is a schematic front view just after a moving mold is filled with resin.

FIG. 26 shows a state in which a moving mold 100 of the metal mold for manufacturing a resin molded assembly 10 is viewed from the front for easy understanding of a slide mold move. The moving mold 100 shown in the figure pairs with a fixed mold 200 positioned on the front side in the paper plane. As shown in the figure, the moving mold 100 consists of housing molds (slide pins) 110 and 110 slidable left and right and capable of molding a housing 20 on the inner face side and retainer molds (assembly slide pins) 120 and 120 sliding in vertical directions on the top and bottom of the housing molds 110 and 110.

Figure 27A:
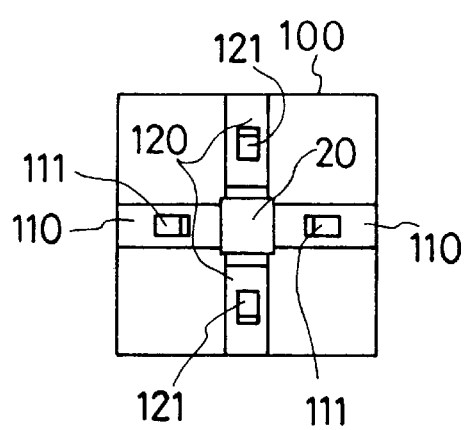
FIGS. 27A–C are axial, vertical and horizontal cross-sectional drawings, respectively, showing internal conditions just after a manufacturing metal mold is filled with resin.
Figure 27B:
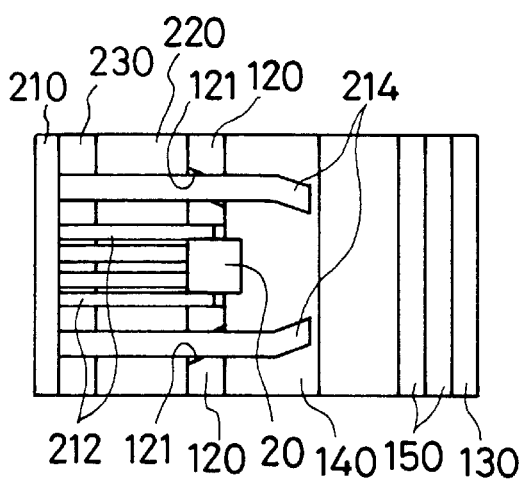
Figure 27C:
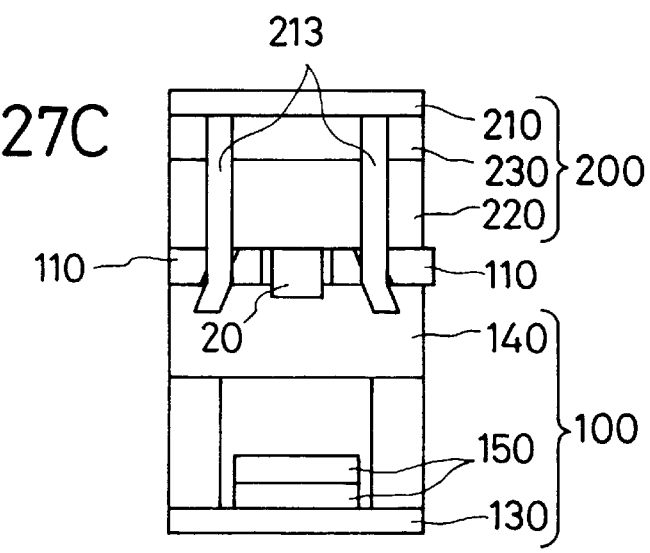

On the other hand, FIG. 27 shows conditions of the moving mold 100 and the fixed mold 200 during mold fastening in cross sections by changing the directions; it shows the cross sections from three directions for easy understanding of the relationship between horizontal and vertical directions. That is, FIG. 27A shows the axial cross section; FIG. 27B shows the vertical cross section; and FIG. 27C shows the horizontal cross section.

The fixed mold 200 comprises a mounting plate 210, a mold plate 220, and a preceding removal plate 230 overlaid on each other; the mounting plate 210 and the preceding removal plate 230 can be separated in one piece from the mold plate 220 and slide. A core pin 211 and slide pins 212 (FIG. 13) fixed to the mounting plate 210 pass through the mold plate 220 and are inserted into the mold space of the resin molded assembly 10. Also, first cam pins 213 and 213 and second cam pins 214 and 214 for driving the housing molds 110 and 110 and the retainer molds 120 and 120 are fixed to the mounting plate 210; they pass through the mounting plate 210 and the mold plate 220 and enter cam holes 111 and 111 and cam holes 121 and 121 made in the housing molds 110 and 110 and the retainer molds 120 and 120. The tips of the first cam pins 213 and the second cam pins 214 are curved. The cam holes 111 and 121 are shaped to enable slide drive in a predetermined direction when the curved tips of the first cam pins 213 and the second cam pins 214 pass therethrough. As shown in FIG. 27, during mold fastening, the first cam pins 213, 213 and the second cam pins 214, 214 pass through the cam holes 111, 111 and the cam holes 121, 121 in linear portions. The tips of the first cam pins 213, 213 are curved outward and the second cam pins 214, 214 are curved inward.

The moving part 100 comprises a mounting plate 130, a mold plate 140, and protrusion plates 150 overlaid on each other; the mold plate 140 and the mounting plate 130 are fixed in relatively unmovable relation, between which the protrusion plates 150 are held slidably. A protrusion pin (not shown) is held on the protrusion plates 150 for use when finished resin molded articles are removed from the metal mold.

Next, a method of manufacturing the resin molded assembly 10 of the above-described structure with the metal mold of the above-described structure will be discussed.

At the beginning, in the moving mold 100, the housing molds 110 and 110 are in intimate contact with each other and on both sides thereof, the retainer molds 120 and 120 stand by at positions forming retainer spaces. The fixed mold 200 is in intimate contact with the front of the moving mold 100 and the core pin 211 and the slide pins 212 project to the insides of terminal metal fitting storage chambers 21 and the inner face portions of retainers 30a and 30b. When the metal mold is filled with molten resin, the resin is solidified between the fixed mold 200 and the moving mold 100. After the solidification, separation of the mounting plate 210 and the preceding removal plate 230 of the fixed mold 200 from the mold plate 220 is started without opening the mold plates 220 and 140 of the fixed mold 200 and the moving mold 100.

Figure 28:
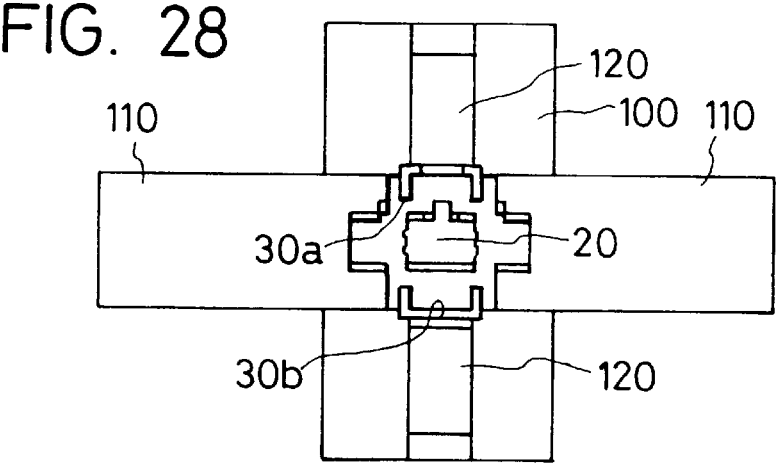
FIG. 28 is a schematic front view in assembling the moving mold.
Figure 29A:
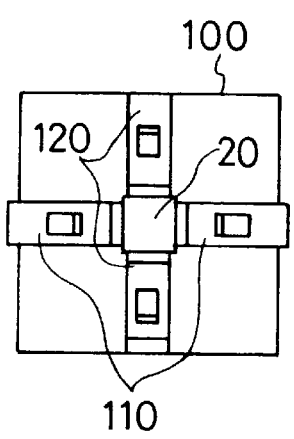
FIGS. 29A–C are axial, vertical and horizontal cross-sectional drawings, respectively, showing internal conditions in assembling the manufacturing metal mold.
Figure 29B:
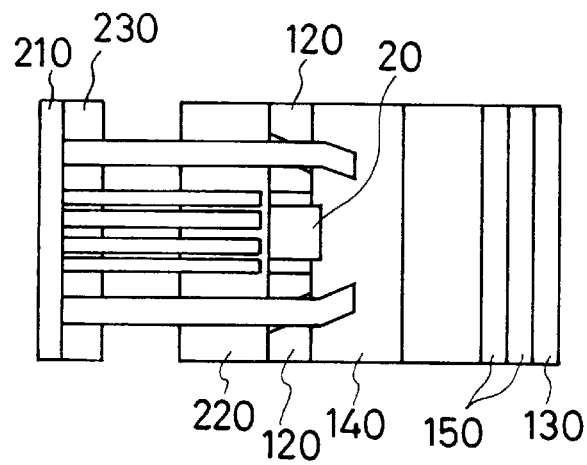
Figure 29C:
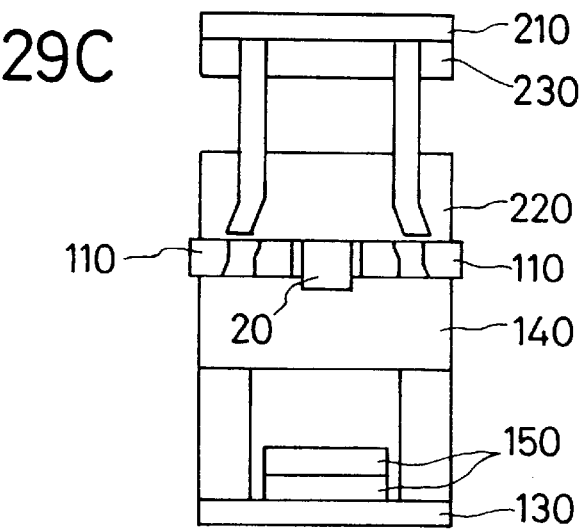

When separation of the mounting plate 210 from the mold plate 220 is started, first the core pin 211 and the slide pins 212 come out of the insides of the terminal metal fitting storage chambers 21 and the inner face portions of the retainers 30a and 30b. The slide pins 212 come out of the inner face portions of the retainers 30a and 30b, whereby a space is formed in the inner face portions of the retainers 30a and 30b. At the same time, the first cam pins 213 and 213 and the second cam pins 214 and 214 also slide; the linear portions of the second cam pins 214 and 214 slide only within the cam holes 121 and 121 made in the retainer molds 120 and 120 and the retainer molds 120 and 120 do not move. However, the outward curved parts of the tips of the first cam pins 213 and 213 pass through the cam holes 111 and 111 made in the housing molds 110 and 110, sliding both the housing molds 110 and 110 outward, as shown in FIGS. 28 and 29. The housing molds 110 and 110 are slid outward, whereby a space is formed between the retainers 30a and 30b and the housing 20, as shown in FIG. 28.

Figure 30:
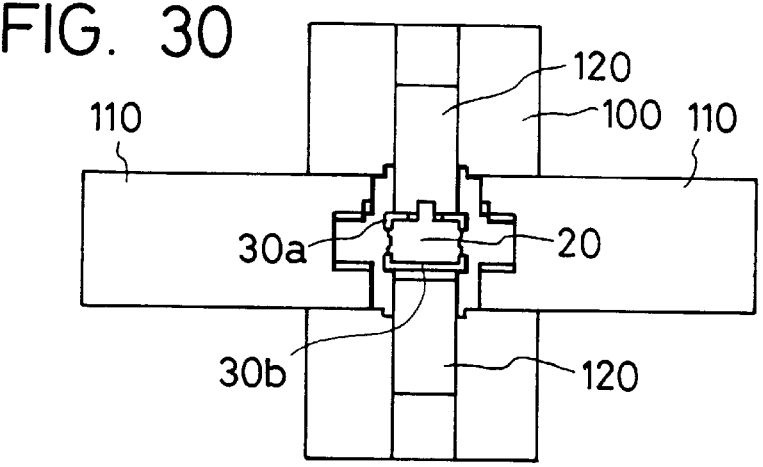
FIG. 30 is a schematic front view upon completion of assembling the moving mold.
Figure 31A:
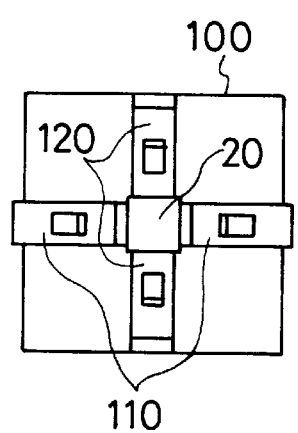
FIGS. 31A–C are axial, vertical and horizontal cross-sectional drawings, respectively, showing internal conditions upon completion of assembling the manufacturing metal mold.
Figure 31B:
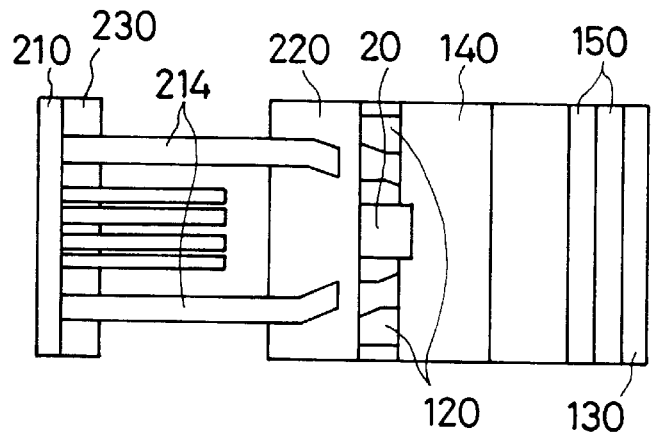
Figure 31C:
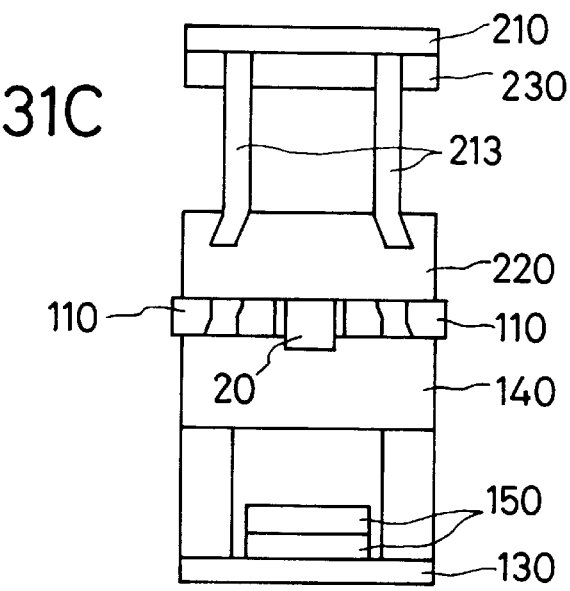

After this, when the mounting plate 210 is furthermore separated from the mold plate 220, the outward curved parts of the tips of the second cam pins 214 and 214 pass through the cam holes 121 and 121 made in the retainer molds 120 and 120, sliding both the retainer molds 120 and 120 to the inside where the housing 20 exists. The retainers 30a and 30b are pressed against the top face and bottom face of the housing 20 from the opening in the U shape with the retainers 30a and 30b held in the retainer molds 120 and 120. When left and right wings 31 and 31 of each retainer 30a, 30b are made to approach the narrow portion of the housing 20 so as to sandwich the portion therebetween, the end faces of the wings 31 abut guide rails 24. The wings 31, which are wedge-shaped in cross section, climb over the guide rails 24. When the guide rails 24 are inserted into guide grooves 32 of the wings 31 for engagement, the retainers 30a and 30b engage the housing 20. Assembling them is now complete, as shown in FIGS. 30 and 31.

When the retainers 30a and 30b are pressed against the top face and bottom face of the housing 20 with the retainers 30a and 30b held in the retainer molds 120 and 120, the fixed mold 200 and the moving mold 100 are in a mold fastening state and the retainers 30a and 30b do not drop from the retainer molds 120 and 120.

After this, when the fixed mold 200 and the moving mold 100 are opened and the protrusion plates 150 of the moving mold 100 are slid, the housing 20 to which the retainers 30a and 30b are fitted is removed from the moving mold 100.

Thus, the moving mold 100 consisting of the slidable housing molds 110 and 110 and the retainer molds 120 and 120 and the fixed mold 200 pairing with the moving mold 100 are used to mold the housing 20 and the retainers 30a and 30b in resin at the same time. The mounting plate 210 and the preceding removal plate 230 are separated from the mold plate 220 and moved in the fixed mold 200 during the mold fastening. While a space is formed between the housing 20 and the retainers 30a and 30b to be fitted to each other, the retainers 30a and 30b are pressed against the housing 20 with the retainers 30a and 30b held in the retainer molds 120 and 120 from both the left and right sides, whereby the housing 20 and the retainers 30a and 30b are assembled. Since they are assembled during the mold fastening, when the retainers 30a and 30b are moved, there is no fear of dropping them.

In the embodiment, the housing molds 110 and the retainer molds 120 are moved in mechanical conjunction with a move of the cam pins, but can also be driven by hydraulic or air pressure or a motor. Space between resin molded articles can be formed not only by mold opening and a linear move of the slide pins, but also by two-dimensional or three-dimensional driving. Further, when the fixed mold 200 and the moving mold 100 are moved, either of them may be moved for mold opening or both of them may be moved at the same time.

Figure 32A:
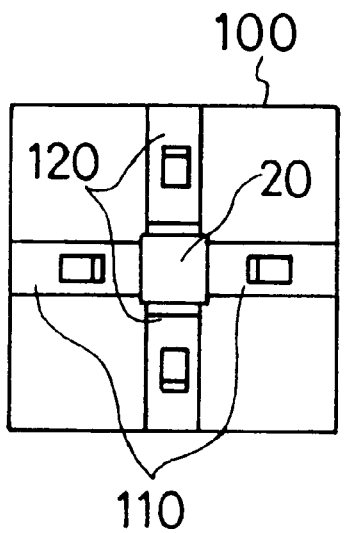
FIGS. 32A–C are axial, vertical and horizontal cross-sectional drawings, respectively, showing internal conditions just after a manufacturing metal mold is filled with resin according to a modified form.
Figure 32B:
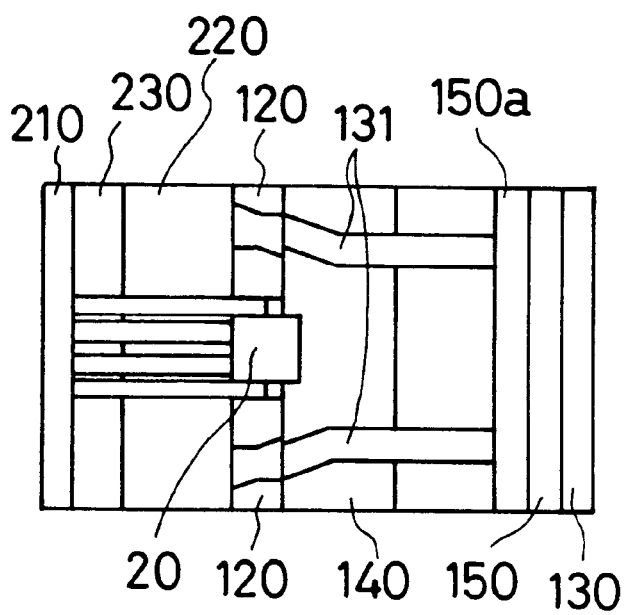
Figure 32C:
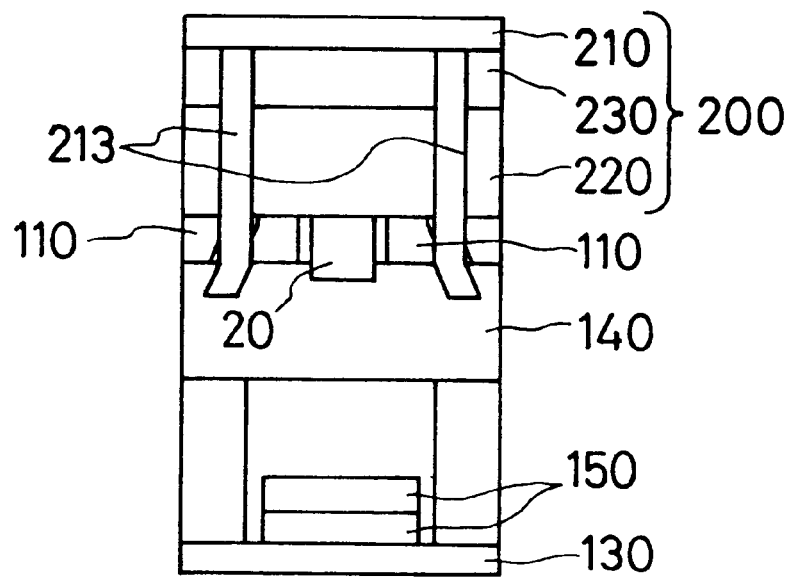
Figure 33A:
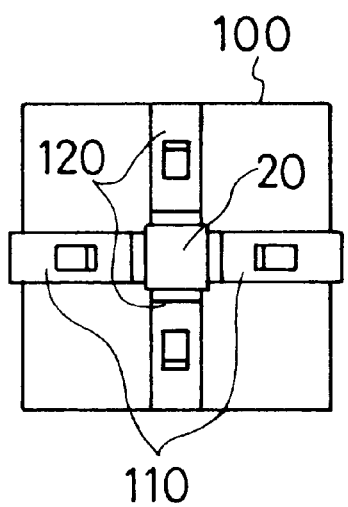
FIGS. 33A–C are axial, vertical and horizontal cross-sectional drawings, respectively, showing internal conditions in assembling the manufacturing metal mold according to the modified form.
Figure 33B:
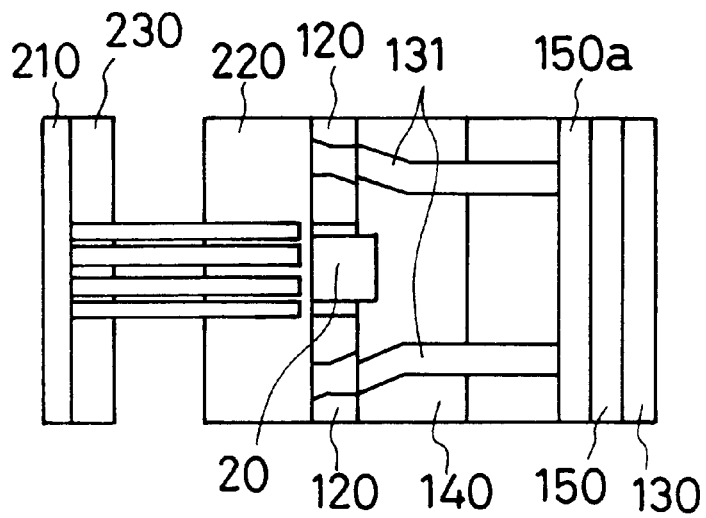
Figure 33C:
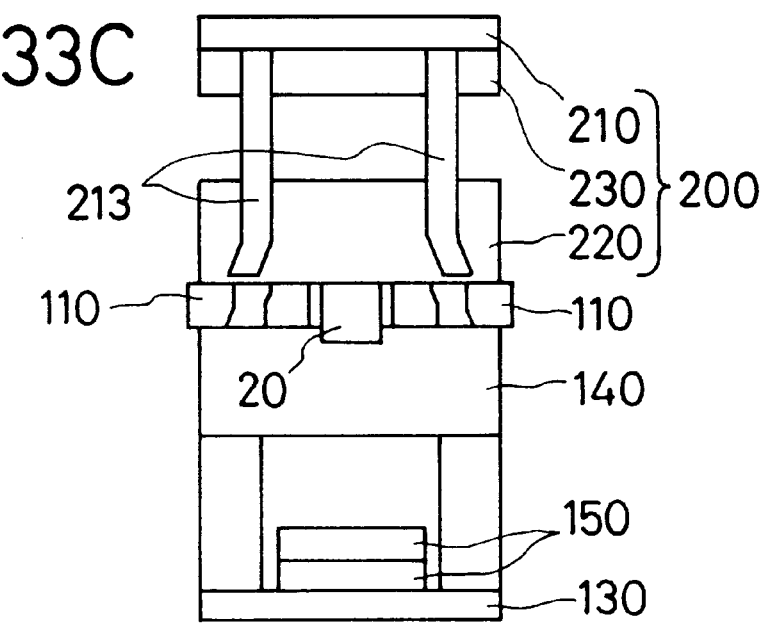
Figure 34A:
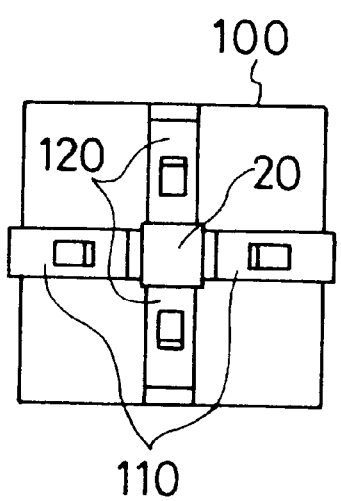
FIGS. 34A–C are axial, vertical and horizontal cross-sectional drawings, respectively, showing internal conditions upon completion of assembling the manufacturing metal mold according to the modified form.
Figure 34B:
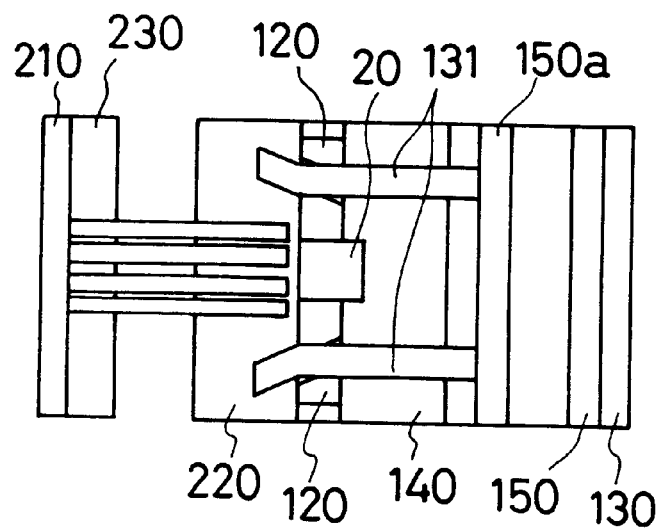
Figure 34C:
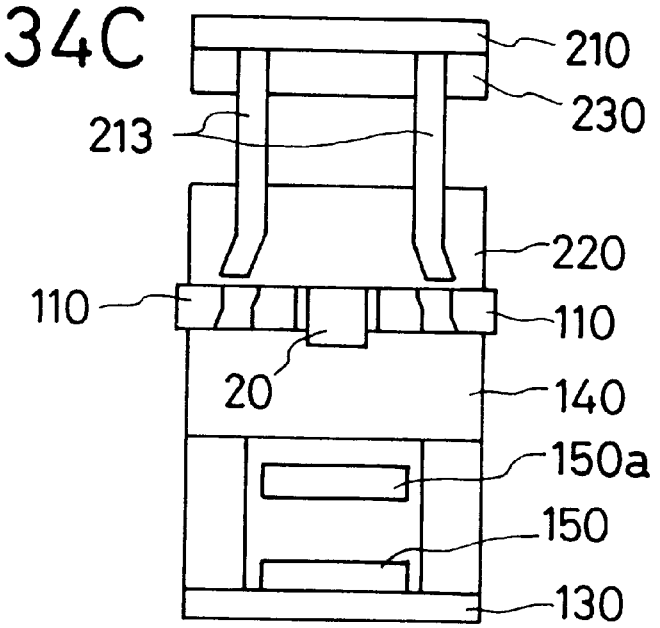

In the embodiment, two pairs of cam pins 213 and 214 are used in the fixed mold 200; FIGS. 32–34 show a modified form comprising third cam pins 131 and 131 for moving retainer molds 120 and 120 to a moving mold 100 in place of the second cam pins 214 and 214 of the fixed mold 200.

The third cam pins 131 and 131 are fixed to a first protrusion plate 150a in a fixed mold 200; they pass through a mold plate 140 and enter cam holes 121 and 121 in the retainer molds 120 and 120, as shown in FIG. 32.

Next, a mounting plate 210 and a preceding removal plate 230 are separated from a mold plate 220 in the fixed mold 200 and housing molds 110 and 110 open left and right, as shown in FIG. 33. Before the fixed mold 200 and the moving mold 100 are opened, the first protrusion plate 150a is protruded and the retainer molds 120 and 120 are moved by means of the third cam pins 131 and 131, as shown in FIG. 34. As a result, a connector 10 can be assembled as in the above-mentioned embodiment.

Third Embodiment

In the first embodiment, the moving mold 100 and the extrusion pin are driven by different drive sources; if the moving mold 100 is adapted to move back and forth between the fixed mold 200 and the extrusion pin, as it moves backward, the extrusion pin protrudes relatively forward.

In the above-mentioned embodiment, the retainer mold 120 is restored to the initial position by the reset drive rod projecting from the fixed mold 200. When the housing 20 to which the retainers 30a and 30b are fitted is removed from the moving mold 100 and then mold fastening is performed, the reset drive rod comes in sliding contact with the cam 121 having a slope formed at the end of the retainer mold 120 and moves it. Therefore, when the housing 20 is driven by the extrusion pin, the retainer mold 120 remains projecting to the housing 20.

In the first and second embodiments, the housing 20 is not wider than the retainer 30a or 30b and if the retainer mold 120 projects to the housing 20, no harm occurs. However, if the housing 20 is wider than the retainer 30a or 30b, when it is driven by the extrusion pin, the retainer mold 120 interferes.

Figure 13:
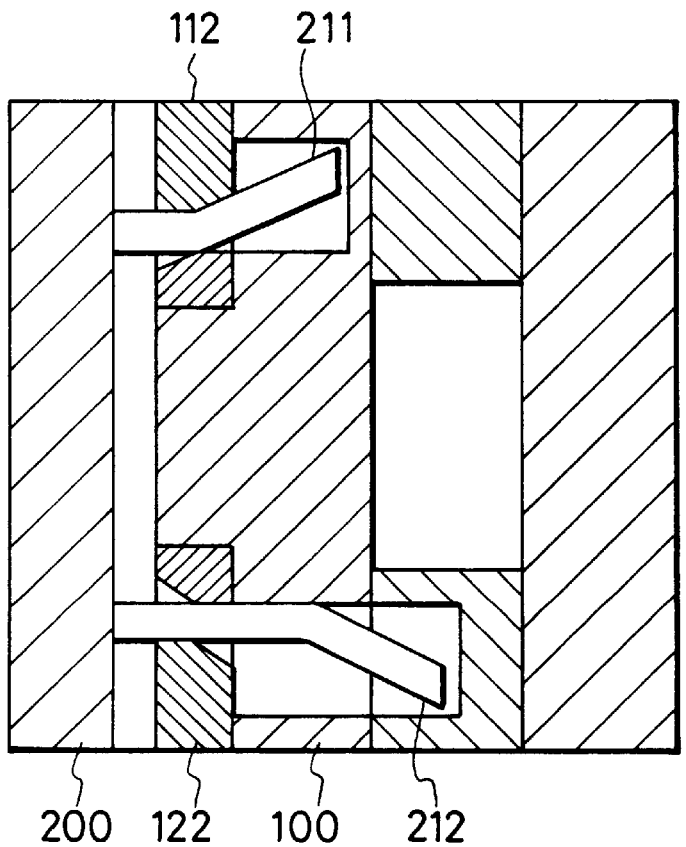
FIG. 13 is a schematic drawing showing a sectional structure of the moving mold and a fixed mold according to the third embodiment of the invention.

FIGS. 12–17 show a third embodiment of the invention for preventing retainer molds 120 and 120 from remaining projecting when a housing 20 is taken out. In the third embodiment, to drive housing molds 110 and retainer molds 120 held slidably in a moving mold 100, as shown in FIG. 13, two cam pieces 211 and 212 functioning like the angular pins 210 in the first embodiment are projected from a fixed mold 200 and sliders 112 and 122 through which the cam pieces 211 and 212 pass are disposed in the moving mold 100.

The housing molds 110 and 110 are coupled to the sliders 112 and 112 supported slidably to the outsides opposed to the housing 20 and short cam pieces 211 and 211 pass through the sliders 112 and 112. As with the angular pins 210, when the moving mold 100 is separated from the fixed mold 200, the sliders 112 and 112 are driven outward and the housing molds 110 and 110 are driven so as to open. On the other hand, when the moving mold 100 and the fixed mold 200 are made to approach each other, the sliders 112 and 112 are driven inward and the housing molds 110 and 110 are driven so as to open. Also in this case, play as with the angular pins 210 is made and the housing molds 110 and 110 open with a slight delay at the mold opening time when the moving mold 100 is separated from the fixed mold 200.

Two sliders 122 and 122 are placed so as to sandwich the slider 112 to one housing mold 110 and long cam pieces 212 and 212 pass through the sliders 122 and 122. The long cam piece 212, 212 is longer in the line portion than the short cam piece 211, 211. Resultantly, the timing of moving the slider 122 becomes different from the timing of moving the slider 112.

Figure 14:
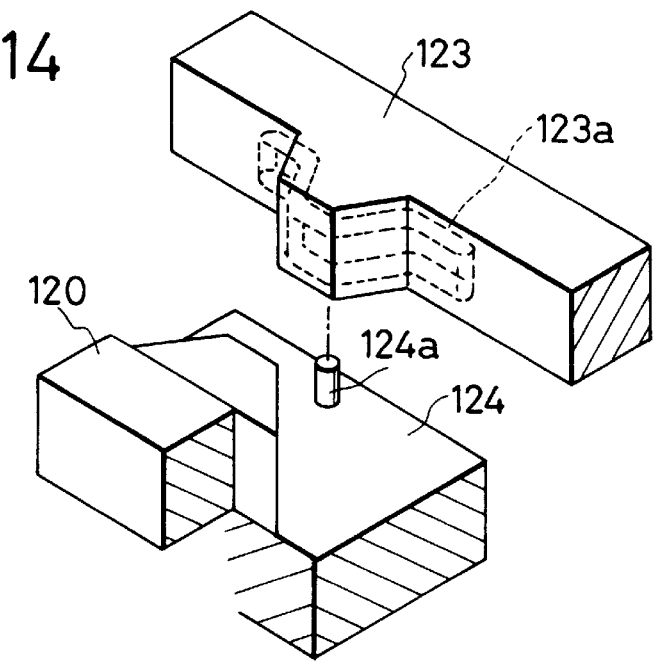
FIG. 14 is a perspective view of a retainer cam piece and a retainer mold.
Figure 15:
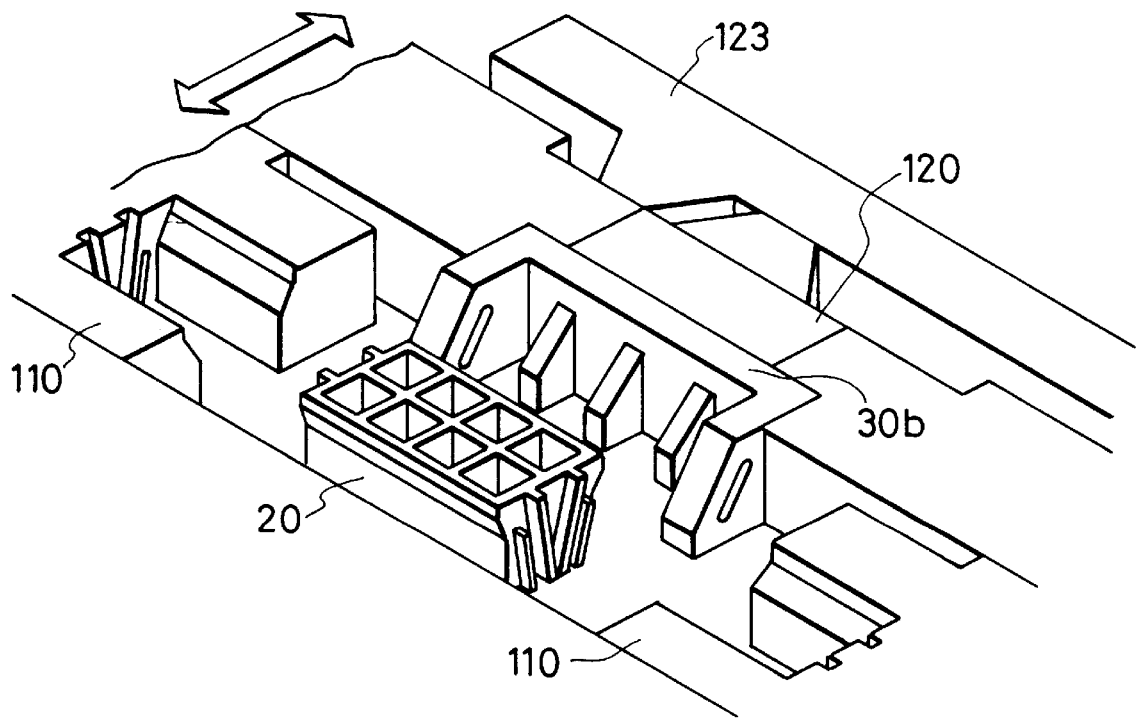
FIG. 15 is a schematic perspective view showing a state in which housing molds open on the moving mold.
Figure 16:
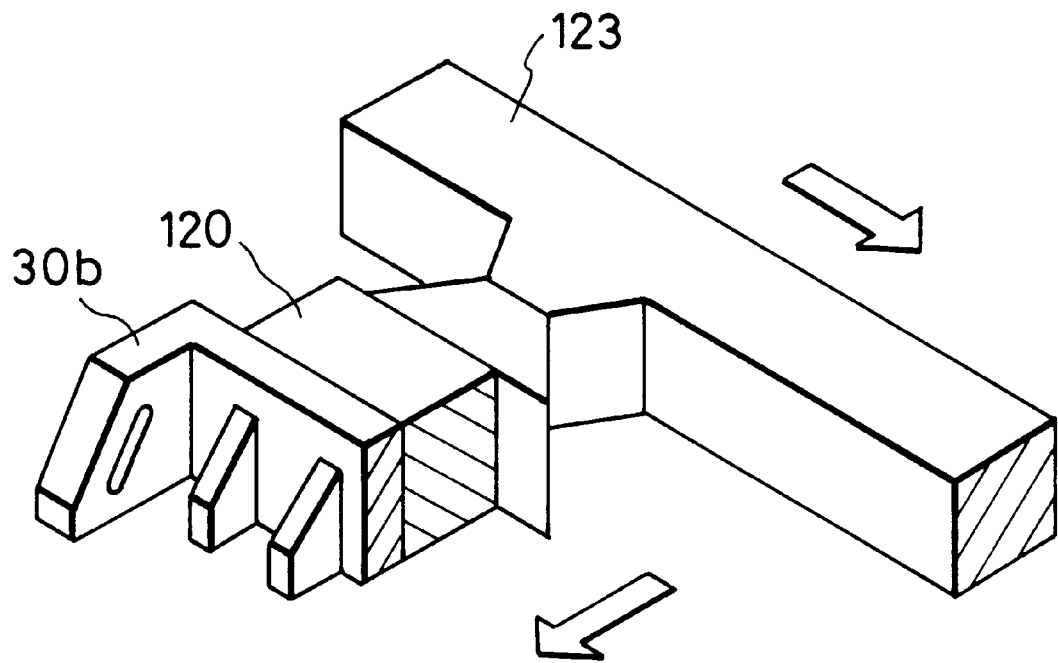
FIG. 16 is a schematic drawing when the retainer mold is extruded by the retainer cam piece.
Figure 17:
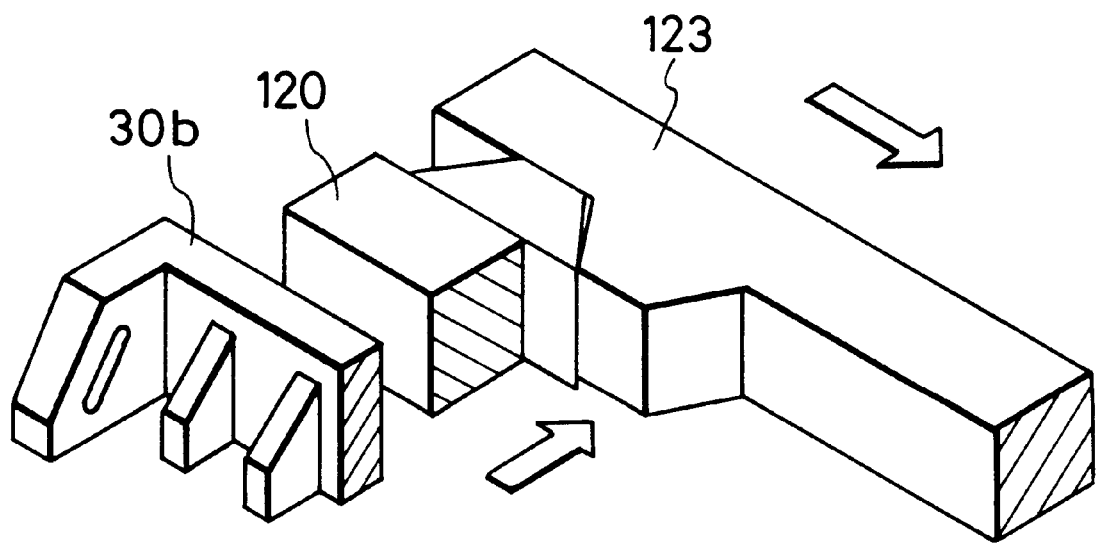
FIG. 17 is a schematic drawing when the retainer mold is pulled back by the retainer cam piece.
Figure 18:
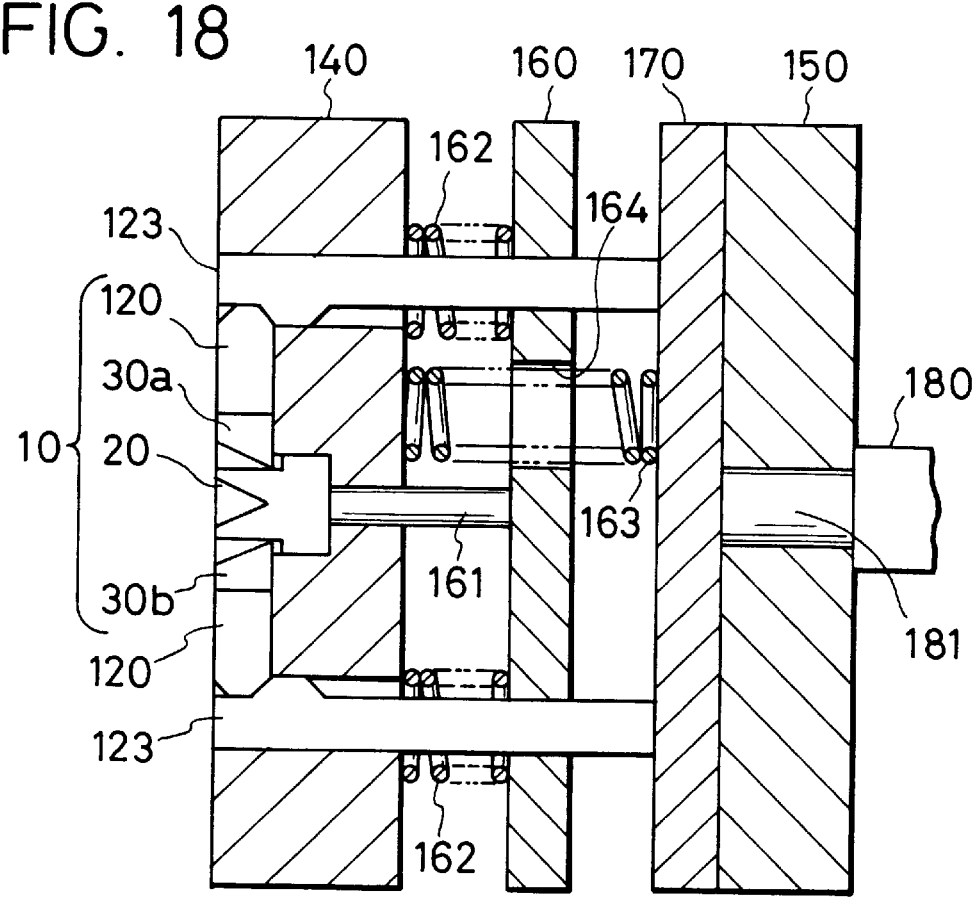
FIG. 18 is a schematic sectional view of a moving mold according to a modified form of the third embodiment.

Coupled to the sliders 122 and 122 are retainer cam pieces 123 and 123 extended in parallel with the move direction of the housing molds 110 and 110 and sandwiching the retainer molds 120 and 120 from both sides. As shown in FIG. 14, each retainer cam piece 123, 123 engages the rear face of the retainer mold 120, 120. That is, the retainer cam piece 123 and the retainer mold 120 have mountain-shaped projections facing each other and when the retainer cam piece 123 reciprocates, its slope presses the retainer mold 120 against the housing 20.

If the retainer mold 120 is only pressed, it remains projecting to the housing 20. However, the retainer mold 120 comprises a plate piece 124 extended so as to overlap the retainer cam piece 123; a protrusion 124a projecting to the retainer cam piece 123 is made in the plate piece 124 and a V-shaped cam groove 123a into which the protrusion 124a can fit is made in the retainer cam piece 123. The cam groove 123a corresponds substantially to the mountain-like projection of the retainer cam piece 123 and the retainer mold 120 extruded by the slope of the retainer cam piece 123 is pulled back by the protrusion 124a fitting into the cam groove 123a when the retainer cam piece 123 furthermore slides. That is, each time the retainer cam piece 123 moves to one side, the retainer mold 120 makes one reciprocation. As a result, after the housing molds 110 and 110 open, the retainer molds 120 and 120 approach the housing 20 while holding the retainers 30a and 30b and press the retainers 30a and 30b against the housing 20 for engaging them, then return to the initial positions. Therefore, after this, if the extrusion pin extrudes the housing 20 from the rear face, the housing pin 20 does not interfere with the retainer mold 120, 120. A spring (not shown) is placed between the moving mold 100 and the retainer molds 120 and 120 for energizing the retainer mold 120, 120 so as to open, preventing looseness.

By the way, basically, if the retainer mold 120 is only reciprocated, it should be sufficient to use the protrusion 124a and the cam groove 123a in combination. However, in the embodiment, the retainer cam piece 123 and the retainer mold 120 are formed with mountain-shaped slopes facing each other and the slopes are used for extrusion. When the retainer mold 120 is driven after mold opening, a large force may be required sometimes, thus it is adequate to butt the slopes against each other for driving the retainer mold 120; the retainer mold 120 can be then pulled back by a small force and the protrusion 124a and the cam groove 123a are used for the purpose. Therefore, the structure can be changed appropriately in such a manner that the slopes are not formed for driving the retainer mold 120 depending on the magnitude of the required force. The position to which the retainer mold 120 is retracted is not necessarily the initial poisition and may be any position at which the retainer mold 120 does not interfere with extrusion of the housing 20.

In the embodiment, a space is formed between the housing 20 and the retainers 30a and 30b by opening the moving mold 100 and the fixed mold 200 and moving the housing molds 110 and 110, thus these correspond to a fifth mold move structure, but the invention is not limited to the structure, needless to say. As the retainer cam piece 123, 123 is slid, the retainer mold 120, 120 reciprocates relative to the housing 20 with the retainer 30a, 30b held in the retainer mold 120, 120, thus the components make up a sixth mold move structure. The sixth mold move structure does not require a separate drive source either if it is a cam structure associated with mold opening, but may be driven separately by using a source such as a hydraulic or air pressure actuator or an electric motor.

For example, FIGS. 18–21 show a modified form of the embodiment wherein an actuator of a protruding mechanism is used for driving and retainer cam pieces 123 are placed in parallel with the mold opening direction.

Figure 19:
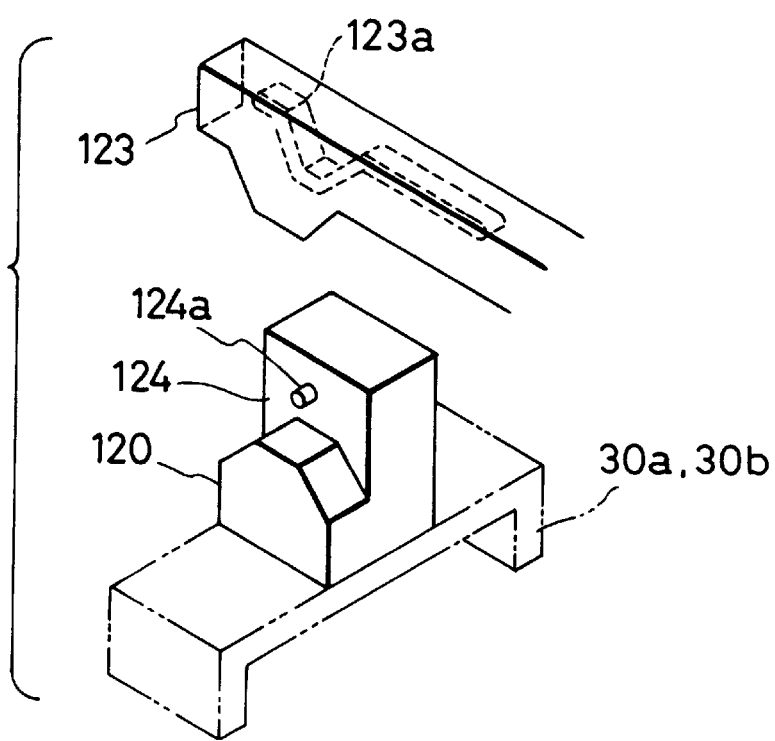
FIG. 19 is a perspective view showing the relationship between a retainer mold and a retainer cam piece according to the modified form of the third embodiment.

A moving mold 100 comprises a mold plate 140 facing the fixed mold 200 for supporting the housing molds 110 and 110 and the retainer molds 120 and 120, a mounting plate 150 spaced at a given distance from and supported on the rear face of the mold 140 space, and a first protrusion plate 160 and a second protrusion plate 170 supported slidably in both directions between the mold plate 140 and the mounting plate 150. For the engagement structure of the retainer mold 120 with a retainer cam piece 123, as shown in FIG. 19, as the slide direction of the retainer cam piece 123 becomes parallel with the mold opening direction, the retainer mold 120 rotates by 90 degrees as a whole and when the retainer cam piece 123 passes through the mold plate 140 and slides back and forth, the retainer mold 120 reciprocates in a similar manner as described above. In the figure, the support structure of the mold plate 140 and the mounting plate 150 is not shown.

The retainer cam pieces 123 protrude to the mounting plate 150 through the mold plate 140 and are fixed to the second protrusion plate 170 through the first protrusion plate 160. The second protrusion plate 170 is fixed to a piston 181 of a protrusion actuator 180 passing through the mounting plate 150. When the actuator 180 receives a pressure oil supply from a hydraulic source (not shown) and moves the piston 181 back and forth, the second protrusion plate 170 reciprocates in parallel between the mold plate 140 and the mounting plate 150.

On the other hand, an extrusion pin 161 is fixed to the first protrusion plate 160 through which the retainer cam pieces 123 pass, and is inserted into a molded hole rear face of a housing 20 in the mold plate 140. The first protrusion plate 160 is supported via springs 162 on the mold plate 140; it is energized by the springs 162 to the side of the mounting plate 150 and is kept within a given distance by a stopper (not shown). Although the first protrusion plate 160 is apart from the second protrusion plate 170 at the normal time, when the second protrusion plate 170 is extruded by the piston 181 and abuts the rear face of the first protrusion plate 160, the first protrusion plate 160 in turn is extruded toward the mold plate 140, pushing the extrusion pin 161 into the molded hole of the housing 20 for extruding the housing 20. A through hole 164 is made in the first protrusion plate 160 and a spring 163 passes through the through hole 164 and is housed therein. The spring 163 energizes the second protrusion plate 170 to the opposite side to the mold plate 140.

Figure 20:
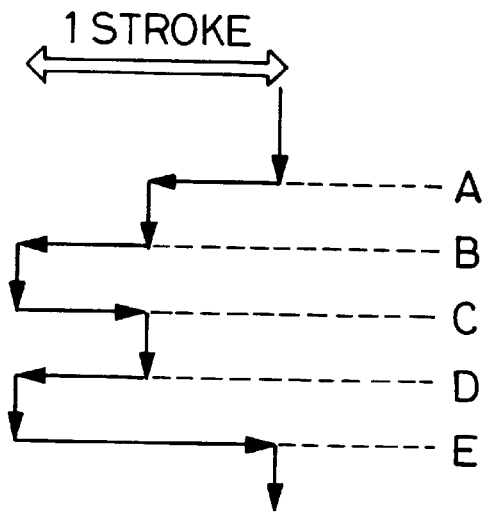
FIG. 20 is a timing chart showing actuator drive timing.
Figure 21:
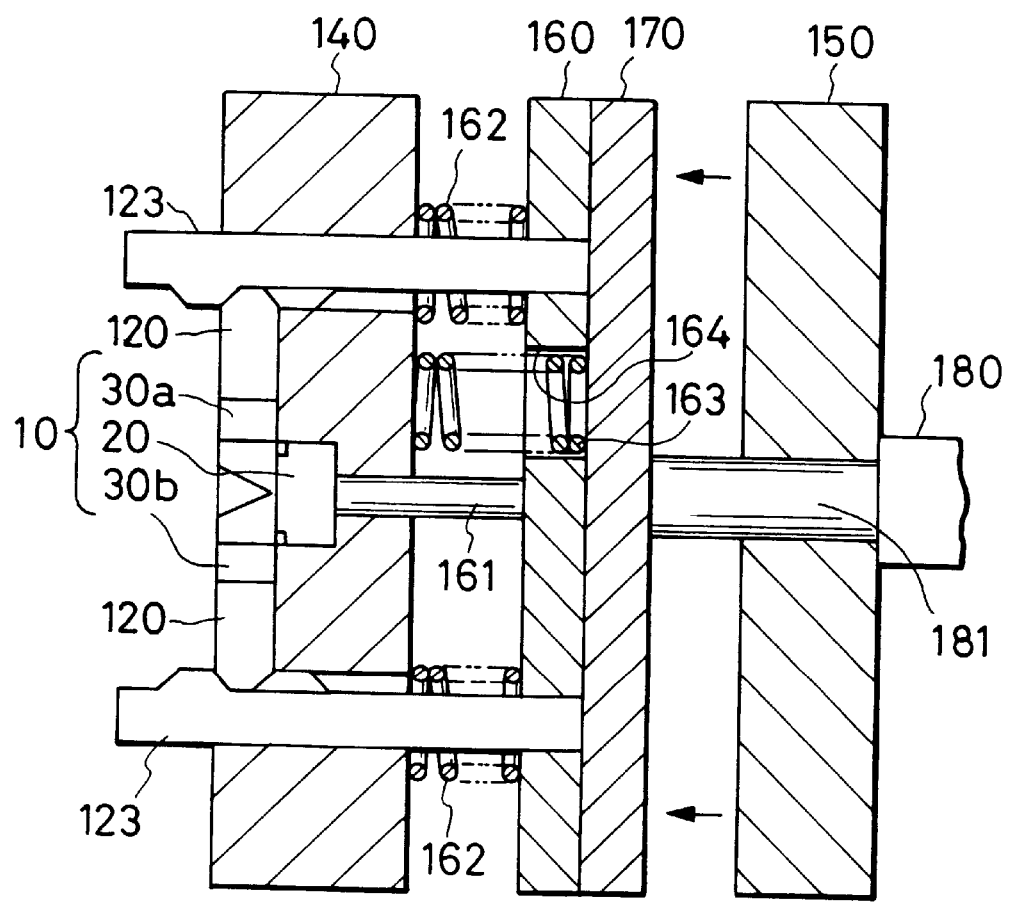
FIG. 21 is a schematic sectional view of the moving mold showing a state in which a first protrusion plate is driven.

After the moving mold 100 and the fixed mold 200 are opened, the piston 181 of the protrusion actuator 180 is driven according to a timing chart shown in FIG. 20. That is, the piston 181 advances by a half stroke at timing A. The half stoke is a distance sufficient for the retainer cam pieces 123 to advance within the mold plate 140 for reciprocating the retainer molds 120 and the upper and lower retainer molds 120 and 120 reciprocate, thereby fitting two retainers 30a and 30b to the housing 20 for assembly, as shown in FIG. 21. The second protrusion plate 170 abuts the rear face of the first protrusion plate 160 by the half stroke of the piston 181.

At the next timing B, the piston 181 advances by a further half stroke. Then, the second protrusion plate 170 advances while it remains striking the first protrusion plate 160, so that the first protrusion plate 160 also advances. At this time, the extrusion pin 161 fixed to the first protrusion plate 160 protrudes to the inside of the molded hole of the housing 20, thus the assembled connector 10 is dropped as shown in FIG. 22. At this time, the retainer cam pieces 123 slide in a condition passing through the mold plate 140, but do not drive the retainer molds 120.

The piston 181 backs once by a half stroke at timing C, and again advances at timing D and backs by a full stroke at timing E. Originally, the connector 10 should be dropped by only once protruding the extrusion pin 161, but may not drop depending on the situation. If the piston 181 backs by a full stroke in such a case, the retainer molds 120 are extruded toward the connector 10 at the center and again back; the retainer molds 120 strike some parts of the connector 10, breaking the parts. To avoid this accident, the extrusion pin 161 is repeatedly protruded in the range in which the retainer molds 120 are not driven even if the retainer cam pieces 123 slide for reliably dropping the connector 10 before the piston 181 is backed completely.

Although the extrusion pin 161 is driven only twice in the embodiment, it may be driven more than twice for reliable extrusion. Since the extrusion pin 161 and the retainer cam pieces 123 may be able to be driven at predetermined timing, they need not necessarily be driven by one actuator 180 and separate drive sources may be provided. Further, for example, a rotating shaft of an electric motor may be provided with a rotation cam and rotated for continuously driving the extrusion pin 161 and the retainer cam pieces 123 without intermittently driving them.

Further, FIGS. 23–25 show a modified form wherein the front and back positional relationship between the second protrusion plate 170 for supporting the retainer cam pieces 123 and the first protrusion plate 160 for supporting the extrusion pin 161 are opposed is reversed.

In the modified form, an eject actuator 184 having a small-diameter part 182 at the tip and a large-diameter part 183 at the rear end is provided in place of the actuator 180 and the piston 181. It abuts the rear face of the second protrusion plate 170 via a through hole 165 made in the first protrusion plate 160.

When the eject actuator 184 is pushed in, only the small-diameter part 182 is passed through the through hole 165 for pushing only the second protrusion plate 170. From where about a half stroke is exceeded, the large-diameter part 183 strikes the margins of the through hole 165 made in the first protrusion plate 160 for pushing the first protrusion plate 160 too.

Fourth Embodiment

A fourth embodiment of the invention will be discussed with reference to FIG. 35. As described above, in the embodiments of the invention, the retainer molds 120 are moved, thereby moving the retainers for fitting them to the housing for assembly.

Figure 35:
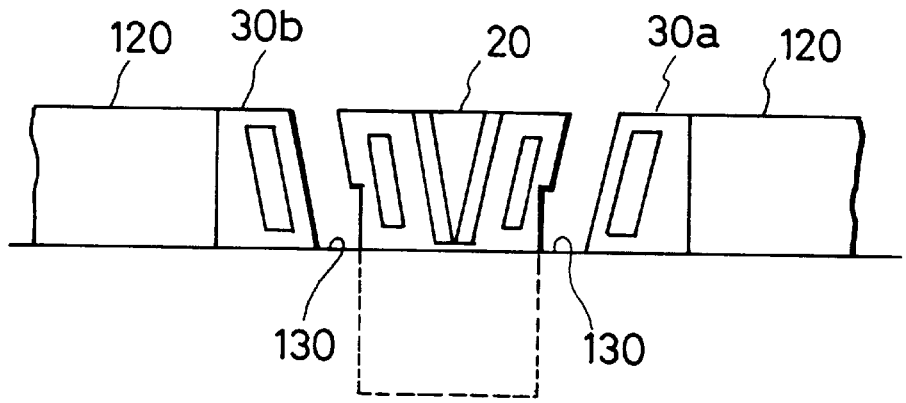
FIG. 35 is a schematic sectional view of a moving mold shown in relation between move positions of retainer molds and slide faces in a fourth embodiment of the invention.

In the fourth embodiment, as shown in FIG. 35, when retainer molds 120 and 120 are moved for moving retainers 30a and 30b, they are moved in parallel with a slide face 130 along the move direction formed on a moving mold 100 and at this time, the retainers 30a and 30b move while sliding on the side face 130.

When the retainers 30a and 30b are held in the retainer molds 120 and 120 and move, as shown in FIG. 35, they move while sliding on the side face 130, whereby the sides of the retainers 30a and 30b facing the slide face 130 are held parallel and the retainers 30a and 30b are transported to a housing without slanting midway.

When left and right wings 31 and 31 of each retainer 30a, 30b are made to approach the housing so as to sandwich a narrow portion of the housing 10, the end faces of the wings 31 abut guide rails 24. Since the wings 31 are wedge-shaped in cross section, they climb over the guide rails 24. When the guide rails 24 are inserted into guide grooves 32 of the wings 31 for engagement, the retainers 30a and 30b engage the housing 20. Assembling them is now complete.

Fifth Embodiment

A fifth embodiment of the invention will be discussed with reference to FIGS. 36 and 37.

Figure 36:
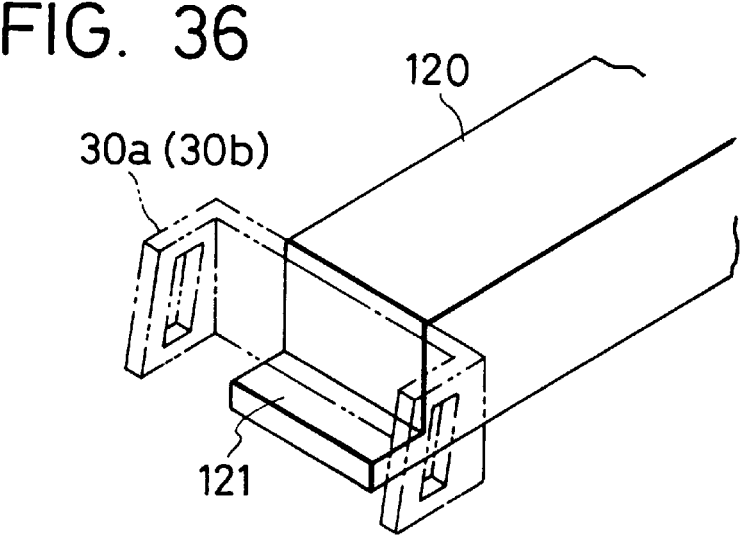
FIG. 36 is a perspective view showing the tip of a retainer mold in a fifth embodiment of the invention.
Figure 37:
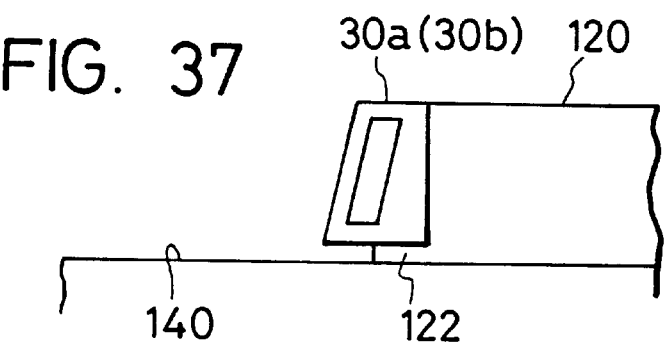
FIG. 37 is a sectional view of a moving mold showing a state in which a retainer is floated from the surrounding wall face and is held in the retainer mold in the fifth embodiment of the invention.

In the fifth embodiment, as shown in FIGS. 36 and 37, a projection piece 122 coming in contact with a wall face 140 to the depth of a moving mold 100 is formed at the tip of each retainer mold 120, 120, forming a step-like level difference. A retainer 30a (30b) comes in contact with a stereoscopic face of a corner of the step-like projection piece 122 and is placed. As shown in FIG. 37, it is moved in a floating condition from the adjoining wall face 140.

When the retainer 30a (30b) is held in the retainer mold 120, 120 and moves, as shown in FIG. 37, it is moved in a floating condition from the surrounding wall face 140, during which shavings of the retainer 30a (30b) do not occur.

Therefore, degradation of the molding accuracy by shavings, dust, etc., can be prevented. The retainer 30a (30b) comes in contact with the stereoscopic face of the corner of the front of the retainer mold 120, 120 and the side face of the projection piece 122 and is held, thus is hard to incline as compared with the case where it comes in contact with one face and is held. Therefore, the retainer 30a (30b) can be prevented from inclining during moving.

Sixth Embodiment

A sixth embodiment of the invention will be discussed with reference to FIGS. 38 and 39.

Figure 38:
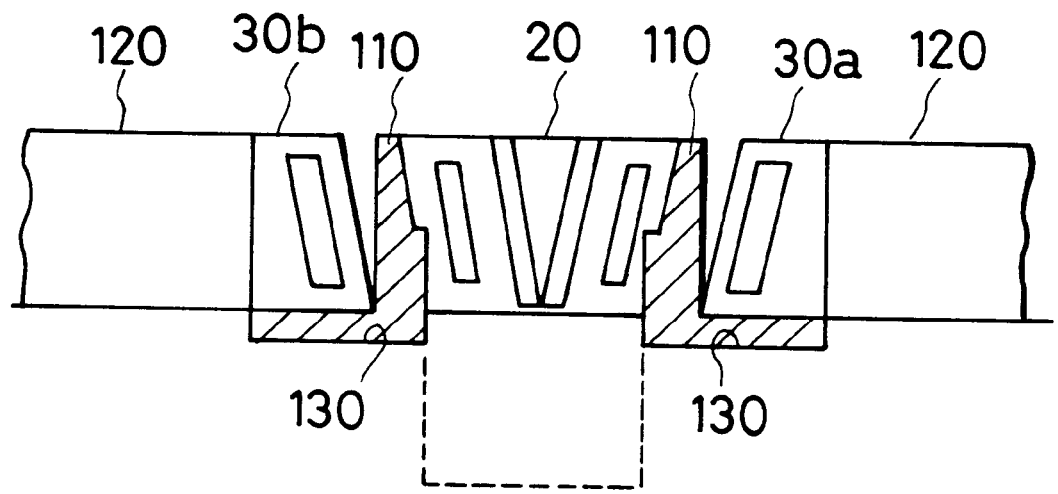
FIG. 38 is a sectional view of a moving mold showing positions before move of housing molds in a sixth embodiment of the invention.

In the sixth embodiment, housing molds 110 and 110 mold a housing 20 on inner sides and as shown in FIG. 38, a part of the housing mold 110, 110 is extended as a flat so as to form a deep face of a retainer 30a (30b). Therefore, when both the housing molds 110 and 110 are closed, the retainers 30a and 30b are in contact with the housing molds 110 and 110 from the deep sides. When the housing molds 110 and 110 are opened, as shown in FIG. 39, the retainers 30a and 30b become out of contact with the housing molds 110 and 110 even on the deep sides. That is, the retainers 30a and 30b float from surrounding wall faces.

Figure 39:
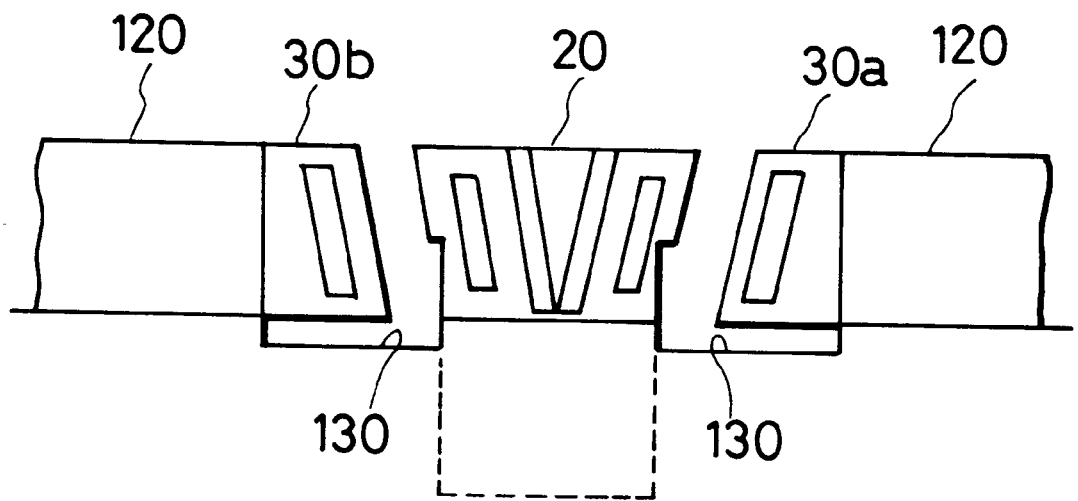
FIG. 39 is a sectional view of the moving mold showing positions after move of the housing molds in the sixth embodiment of the invention.

When the retainers 30a and 30b are held in the retainer molds 120 and 120 and move, as seen in FIG. 39, they float from the surrounding wall faces and move in noncontact, whereby they are transported to the housing 20 without producing shavings 140. Since dust such as shavings is not left in the metal mold, the molding accuracy of the subsequently molded retainers 30a and 30b is improved.

According to the invention, when forming of the connector housing and the retainer, different resins in material or color may be filled in the connector forming mold and the retainer forming mold, so that the connector housing and the retainer can be made different in material or color.

What is claimed is:

1. A method of manufacturing a resin molded assembly, said method comprising the steps of:

molding first and second resin molded articles in a metal mold composed of a first mold, a second mold opposed to said first mold, said second mold being movable in a first direction toward said first mold, a pair of housing molds for forming the first resin molded article, said pair of housing molds being slidable in a second direction perpendicular to said first direction, and a pair of retainer molds for forming the second resin molded article, said pair of retainer molds being slidable in a third direction perpendicular to said first and second directions;

removing said pair of housing molds located between the first resin molded article and the second resin molded article to form a space;

moving said pair of retainer molds located aside of the second resin molded article, while the first resin molded article is held; and pressing the second resin molded article against the first resin molded article to provisionally fit the second resin molded article with the first resin molded article and form the resin molded assembly.

2. The method as claimed in claim 1, wherein an undercut is made in the moved pair of retainer molds to hold the second resin molded article.

3. The method as claimed in claim 1, wherein the moved pair of retainer molds press the second resin molded article against the first resin molded article at a position shifted off a bending piece of the first resin molded article.

4. The method as claimed in claim 1, wherein the moved pair of retainer molds move while the second resin molded article is slid on a slide face along a move direction.

5. The method as claimed in claim 1, wherein the moved pair of retainer molds are formed with a level difference toward a moved direction to hold the second resin molded article on a stereoscopic face of the metal mold to prevent inclined motion of the second resin molded article.

6. The method as claimed in claim 1, wherein the second resin molded article is floated from a surrounding wall face of the metal mold and moved toward the first resin molded article.

7. The method as claimed in claim 1, further comprising the steps of:

retracting the moved pair of retainer molds after pressing the second resin molded article against the first resin molded article to provisionally fit the second resin molded article to the first resin molded article; and removing the first resin molded article from the metal mold.

8. The method as claimed in claim 1, further comprising a step of forming the first resin molded article and the second resin molded article from different materials or colors.

9. The method as claimed in claim 1, wherein the first resin molded article is a connector housing, and the second resin molded article is a retainer.

* * * * *